(12) United States Patent
Yamashita et al.

(10) Patent No.: US 10,943,745 B2
(45) Date of Patent: Mar. 9, 2021

(54) ELECTRIC STORAGE DEVICE

(71) Applicant: KABUSHIKI KAISHA TOYOTA JIDOSHOKKI, Kariya (JP)

(72) Inventors: Yusuke Yamashita, Kariya (JP); Takayuki Hirose, Kariya (JP); Shinji Suzuki, Kariya (JP); Yasuaki Takenaka, Kariya (JP); Masato Ogasawara, Kariya (JP); Atsushi Minagata, Kariya (JP); Hirokuni Akiyama, Kariya (JP); Motoaki Okuda, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 52 days.

(21) Appl. No.: 16/088,342

(22) PCT Filed: Mar. 31, 2017

(86) PCT No.: PCT/JP2017/013593
§ 371 (c)(1),
(2) Date: Sep. 25, 2018

(87) PCT Pub. No.: WO2017/171002
PCT Pub. Date: Oct. 5, 2017

(65) Prior Publication Data
US 2019/0115163 A1    Apr. 18, 2019

(30) Foreign Application Priority Data

Mar. 31, 2016  (JP) .............................. JP2016-072927
Aug. 30, 2016  (JP) .............................. JP2016-168241

(51) Int. Cl.
*H01G 11/14*   (2013.01)
*H01G 11/74*   (2013.01)
(Continued)

(52) U.S. Cl.
CPC ............. *H01G 11/14* (2013.01); *H01G 11/18* (2013.01); *H01G 11/74* (2013.01); *H01G 11/76* (2013.01);
(Continued)

(58) Field of Classification Search
CPC ........ H01G 11/14; H01G 11/74; H01G 11/80; H01G 11/82; H01G 11/78; H01M 2/0277; H01M 2/04; H01M 2/26
(Continued)

(56) References Cited

U.S. PATENT DOCUMENTS

2012/0088128 A1    4/2012  Matsuura et al.
2013/0271893 A1*  10/2013  Yamada ................ H01G 11/74
                                                         361/502

(Continued)

FOREIGN PATENT DOCUMENTS

CN    202120990 U    1/2012
CN    104319360 A    1/2015
(Continued)

OTHER PUBLICATIONS

International Search Report of PCT/JP2017/013593 filed May 23, 2017.
(Continued)

*Primary Examiner* — Arun Ramaswamy
(74) *Attorney, Agent, or Firm* — Sughrue Mion, PLLC

(57) ABSTRACT

The electric storage device includes an electrode assembly having a positive electrode and a negative electrode, a case for housing the electrode assembly, a pressure relief valve, and positive and negative electrode conductive members that are electrically connected to the respective corresponding electrodes. The case has a wall in which the pressure relief valve is disposed. At least one of the positive and negative electrode conductive members includes an inter-
(Continued)

posing portion located between the inner surface of the wall and an end face of the electrode assembly facing the inner surface, and a shielding portion located closer to the end face of the electrode assembly than the interposing portion. The shielding portion covers the pressure release valve from a side of the wall where the electrode assembly is located.

14 Claims, 9 Drawing Sheets

(51) Int. Cl.
      *H01G 11/78*       (2013.01)
      *H01G 11/80*       (2013.01)
      *H01G 11/82*       (2013.01)
      *H01M 2/02*       (2006.01)
      *H01M 2/04*       (2006.01)
      *H01M 2/26*       (2006.01)
      *H01M 10/04*       (2006.01)
      *H01M 2/12*       (2006.01)
      *H01G 11/76*       (2013.01)
      *H01G 11/18*       (2013.01)
      *H01G 9/12*       (2006.01)

(52) U.S. Cl.
    CPC .............. *H01G 11/78* (2013.01); *H01G 11/80* (2013.01); *H01G 11/82* (2013.01); *H01M 2/02* (2013.01); *H01M 2/0277* (2013.01); *H01M 2/04* (2013.01); *H01M 2/12* (2013.01); *H01M 2/26* (2013.01); *H01M 10/04* (2013.01); *H01G 9/12* (2013.01); *Y02E 60/13* (2013.01)

(58) Field of Classification Search
    USPC ................ 361/502, 535, 503, 517, 519, 521
    See application file for complete search history.

(56) References Cited

U.S. PATENT DOCUMENTS

2016/0133900 A1     5/2016   Li et al.
2016/0133901 A1     5/2016   Li et al.

FOREIGN PATENT DOCUMENTS

| JP | 2000-331661 A | 11/2000 |
|---|---|---|
| JP | 2005-267945 A | 9/2005 |
| JP | 4881409 B2 | 2/2012 |
| JP | 2015159087 A | 9/2015 |

OTHER PUBLICATIONS

International Preliminary Report on Patentability with translation of Written Opinion dated Oct. 2, 2018 in International Application No. PCT/JP2017/013593.

* cited by examiner

ELECTRIC STORAGE DEVICE

This application is a National Stage of International Application No. PCT/JP2017/013593 filed Mar. 31, 2017, claiming priorities based on Japanese Patent Application No. 2016-072927 filed Mar. 31, 2016, and Japanese Patent Application No. JP 2016-168241 filed Aug. 30, 2016.

TECHNICAL FIELD

The present invention relates to an electric storage device including a pressure release valve.

BACKGROUND ART

A rechargeable battery, such as a lithium ion battery, is mounted as an electric storage device that stores supplying power to an electrical motor, which is a prime mover, installed in a vehicle such as an electric vehicle (EV), a plug-in hybrid vehicle (PHV), or the like. Patent document 1 describes an example of a rechargeable battery accommodating an electrode assembly and an electrolytic solution in a case. A pressure release valve is arranged in the wall of the case to release pressure out of the case.

PRIOR ART DOCUMENTS

Patent Document

PATENT DOCUMENT 1: Japanese Patent No. 4881409

SUMMARY OF THE INVENTION

Problems that are to be Solved by the Invention

When a nail penetration test, which is one type of evaluation test, is carried out on such a rechargeable battery, a nail breaks a separator located between a positive electrode and a negative electrode. This short-circuits the positive electrode and the negative electrode in the case. When such short-circuiting occurs, heat is generated around the short-circuited part. The heat decomposes the electrolytic solution component and generates gas in the case. This may raise the pressure in the case and rip open the pressure release valve. When the gas is released from the pressure release valve out of the case, parts of the electrodes may be scraped by the high pressure gas, and such parts of the electrodes may be carried out of the gas and scattered as fragments.

It is an object of the present invention to provide an electric storage device that obviates the scattering of electrode fragments from the ripped open pressure release valve during the nail penetration test.

Means for Solving the Problem

An electric storage device that solves the above problem includes an electrode assembly, a case, a pressure release valve, a positive electrode conductive member, and a negative electrode conductive member. The electrode assembly has a layered structure and includes a positive electrode and a negative electrode insulated from each other. Each of the positive electrode and the negative electrode includes a metal foil, an active material layer applied to at least one surface of the metal foil, and a non-coated portion where the active material layer is not applied and the metal foil is exposed. The case accommodates the electrode assembly. The pressure release valve exists on a wall of the case and is configured to be ripped open when pressure in the case reaches a release pressure in order to release the pressure out of the case. The positive electrode conductive member and the negative electrode conductive member at least partially exist between an inner surface of the wall where the pressure release valve exists and an end face of the electrode assembly facing the inner surface. The positive electrode conductive member and the negative electrode conductive member are electrically connected to the non-coated portion of the positive electrode and the non-coated portion of the negative electrode, respectively. At least one of the positive electrode conductive member and the negative electrode conductive member includes an interposing portion located between the inner surface of the wall and the end face of the electrode assembly and a shielding portion located closer to the end face of the electrode assembly than the interposing portion. The shielding portion covers the pressure release valve from a side of the wall where the electrode assembly is located.

Therefore, during the nail penetration test, when the nail penetrates the electric storage device, the electrodes of different polarities are short-circuited in the case through the nail. When the short-circuiting occurs, heat is generated around the short-circuited part. This decomposes the electrolytic solution component and generates gas. The generation of gas raises the pressure in the electric storage device. When the internal pressure of the case reaches the release pressure of the pressure release valve, the pressure release valve is ripped open, and the gas in the case is released out of the case.

The high pressure gas generated in the short-circuited part rises toward the pressure release valve. Furthermore, part of the electrode is scraped into fragments by the force of the generated gas. The gas directed toward the pressure release valve strikes the shielding portion that covers the pressure release valve from the side of the wall of the case where the electrode assembly is located. This changes the flowing direction of the gas and lengthens the gas discharge path toward the pressure release valve. Thus, the fragments of the electrode in the gas easily fall out of the gas. This obviates the scattering of electrode fragments from the ripped open pressure release valve toward the outside of the case.

Furthermore, the shielding portion is farther from the wall where the pressure release valve exists than the interposing portion and located closer to the electrode assembly than the interposing portion. Thus, the flow path of the gas directed toward the pressure release valve is not constricted even when the pressure release valve is covered by the shielding portion from the side of the wall where the electrode assembly is located. This obviates the scattering of electrode fragments out of the case while obtaining the flow path for gas to the pressure release valve.

The case is made of aluminum, and the positive electrode conductive member includes the shielding portion and is made of aluminum.

Therefore, electrical corrosion does not occur even when the shielding portion comes into contact with the case. Thus, the shielding portion can be enlarged toward the inner surface of the case, and the gas discharged from the electrode assembly can easily strikes the shielding portion. The shielding portion is made of aluminum. This lowers manufacturing cost even when the shielding portion is enlarged.

The negative electrode conductive member includes the shielding portion and is made of copper.

Therefore, the shielding portion, which is made of copper, does not melt even when the high temperature gas strikes the shielding portion. This limits the generation of sparks.

The positive electrode includes a positive electrode tab connected to the positive electrode conductive member, and the negative electrode includes a negative electrode tab connected to the negative electrode conductive member. The positive electrode tab and the negative electrode tab are each shaped to project from the end face of the electrode assembly. One of the positive electrode conductive member and the negative electrode conductive member is a first conductive member including the shielding portion, and the other one of the positive electrode conductive member and the negative electrode conductive member is a second conductive member not including the shielding portion. The first conductive member includes an overlapping portion overlapping a tab having a polarity differing from a polarity of the first conductive member and covering the tab as viewed from an outer surface of the wall.

Therefore, when the gas is discharged from between the tabs adjacent to each other in the stacking direction, the gas strikes the overlapping portion, and the fragments of the electrode in the gas fall out the gas.

The overlapping portion and the second conductive member are spaced apart in a direction connecting the wall and the electrode assembly.

Therefore, the gas striking the shielding portion flows through the gap between the overlapping portion and the second conductive member to reach the pressure release valve. Thus, with the arrangement of the overlapping portion, the gas discharge path is further lengthened, and the fragments of the electrode in the gas fall out of the gas.

One of the positive electrode conductive member and the negative electrode conductive member is a first conductive member including the shielding portion, and the other one of the positive electrode conductive member and the negative electrode conductive member is a second conductive member not including the shielding portion. The second conductive member is located closer to the wall than the first conductive member. The first conductive member and the second conductive member overlap each other in a direction connecting the wall and the electrode assembly. The second conductive member includes a bent portion that is bent so that a distal end of the second conductive member is directed toward an edge of the pressure release valve.

Therefore, the gas generated during the nail penetration test is changed in direction when striking the shielding portion and passed between the opposing surfaces of the second conductive member and the shielding portion to flow toward the pressure release valve. The second conductive member has a shape in which the distal end side is directed toward an edge of the pressure release valve by a bent portion. Thus, the gas flowing along the distal end side of the second conductive member can flow toward the pressure release valve.

The positive electrode conductive member and the negative electrode conductive member are arranged so as not to overlap each other in a direction connecting the wall and the electrode assembly.

Therefore, even when the gas strikes the shielding portion or the electric storage device is vibrated, the conductive members of different polarities do not come into contact are not short circuited.

The positive electrode conductive member and the negative electrode conductive member each include the shielding portion, and the shielding portions both overlap each other in a direction connecting the wall and the electrode assembly.

Therefore, the gas strikes the shielding portion closer to the electrode assembly of the two shielding portions, thus changing the flowing direction of the gas. The gas, of which direction is changed, flows between the overlapping shielding portions toward the pressure release valve. Thus, the discharge path of the gas directed toward the pressure release valve can be lengthened.

An axis extending in a stacking direction of the positive electrode and the negative electrode is referred to as an X axis, and an axis orthogonal to the X axis and parallel to the wall is referred to as a Y axis. The positive electrode conductive member and the negative electrode conductive member are arranged next to each other in a direction of the Y axis. The pressure release valve is arranged closer to one end in the direction of the Y axis. One of the conductive members that is arranged closer to the one end includes the shielding portion.

Therefore, in the one conductive member that is arranged closer to one end, the distal end of the shielding portion is located at a position beyond the pressure release valve in the direction of the Y axis. Thus, with respect to the gas flowing along the shielding portion, the gas is separated from the pressure release valve in the direction of the Y axis, and the gas discharge path to the pressure release valve is lengthened.

An axis extending in a stacking direction of the positive electrode and the negative electrode is referred to as an X axis, and an axis orthogonal to the X axis and parallel to the wall is referred to as a Y axis. The positive electrode conductive member and the negative electrode conductive member are arranged next to each other in a direction of the Y axis. The positive electrode is one of a plurality of stacked positive electrode and the negative electrode is one of a plurality of stacked negative electrodes. The at least one of the conductive members including the shielding portion includes a rib projecting toward the wall from an edge of the shielding portion extending in the direction of the Y axis.

Therefore, during the nail penetration test, the gas also flows toward the pressure release valve from an end of the electrode assembly in the stacking direction (direction of X axis). Such gas can strike the rib extending in the direction of the Y axis, and fragments of the electrode fall out of the gas. This obviates the scattering of electrode fragments from the ripped open pressure release valve toward the outside of the case.

An axis extending in a stacking direction of the positive electrode and the negative electrode is referred to as an X axis, and an axis orthogonal to the X axis and parallel to the wall is referred to as a Y axis. The positive electrode conductive member and the negative electrode conductive member are arranged next to each other in a direction of the Y axis. The at least one of the conductive members including the shielding portion further includes a rib projecting toward the wall from an edge of the shielding portion extending in a direction of the X axis.

Therefore, even when the gas flows toward the pressure release valve along the direction of the Y axis, the gas strikes the rib extending in the direction of the X axis so that fragments of the electrode fall out of the gas. This obviates the scattering of electrode fragments from the ripped open pressure release valve toward the outside of the case.

The rib projecting from the edge of the shielding portion, which extends in the direction of the X axis includes, a gas passage hole.

Therefore, when the gas strikes the rib, the fragments of the electrode fall out of the gas. The gas can be passed through the gas passage hole and released out of the case from the ripped open pressure release valve. In other words, the gas passage hole functions to remove electrode fragments that cause sparks. As a result, electrode fragments in the gas are not scattered out of the case, and the generation of sparks is reduced.

An electric storage device that solves the above problem includes an electrode assembly, a case, a pressure release valve, a positive electrode conductive member, and a negative electrode conductive member. The electrode assembly has a layered structure and includes a positive electrode and a negative electrode insulated from each other. Each of the positive electrode and the negative electrode includes a metal foil, an active material layer applied to at least one surface of the metal foil, and a non-coated portion where the active material layer is not applied and the metal foil is exposed. The case accommodates the electrode assembly. The pressure release valve exists on a wall of the case and is configured to be ripped open when pressure in the case reaches a release pressure in order to release the pressure out of the case. The positive electrode conductive member and the negative electrode conductive member at least partially exist between an inner surface of the wall where the pressure release valve exists and an end face of the electrode assembly facing the inner surface. The positive electrode conductive member and the negative electrode conductive member are electrically connected to the non-coated portion of the positive electrode and the non-coated portion of the negative electrode, respectively. At least one of the positive electrode conductive member and the negative electrode conductive member includes an interposing portion located between the inner surface of the wall and the end face of the electrode assembly and a flat shielding portion continuous and flush with the interposing portion along the inner surface of the wall. The shielding portion covers the pressure release valve from a side of the wall where the electrode assembly is located.

Therefore, during the nail penetration test, when the nail penetrates the electric storage device, the electrodes of different polarities are short-circuited in the case through the nail. When the short-circuiting occurs, heat is generated around the short-circuited part. This decomposes the electrolytic solution component and generates gas. The generation of gas raises the pressure in the electric storage device. When the internal pressure of the case reaches the release pressure of the pressure release valve, the pressure release valve is ripped open, and the gas is released out of the case.

The high pressure gas generated in the short-circuited part rises toward the pressure release valve. Furthermore, part of the electrode is scraped into fragments by the force of the generated gas. The gas directed toward the pressure release valve strikes the shielding portion that covers the pressure release valve from the side of the wall of the case where the electrode assembly is located. This changes the flowing direction of the gas and lengthens the gas discharge path toward the pressure release valve. Thus, the fragments of the electrode in the gas easily fall out of the gas. This obviates the scattering of electrode fragments from the ripped open pressure release valve toward the outside of the case.

An electric storage device that solves the above problem includes an electrode assembly, a case, a pressure release valve, a positive electrode conductive member, and a negative electrode conductive member. The electrode assembly has a layered structure and includes a positive electrode and a negative electrode insulated from each other. Each of the positive electrode and the negative electrode includes a metal foil, an active material layer applied to at least one surface of the metal foil, and a non-coated portion where the active material layer is not applied and the metal foil is exposed. The case accommodates the electrode assembly. The pressure release valve exists on a wall of the case and is configured to be ripped open when pressure in the case reaches a release pressure in order to release the pressure out of the case. The positive electrode conductive member and the negative electrode conductive member at least partially exist between an inner surface of the wall where the pressure release valve exists and an end face of the electrode assembly facing the inner surface. The positive electrode conductive member and the negative electrode conductive member are electrically connected to the non-coated portion of the positive electrode and the non-coated portion of the negative electrode, respectively. At least one of the positive electrode conductive member and the negative electrode conductive member includes an interposing portion located between the inner surface of the wall and the end face of the electrode assembly, a shielding portion located closer to the end face of the electrode assembly than the interposing portion, and a rib rising from the shielding portion toward the wall and including a surface intersecting a gas path lying along a plane direction of the shielding portion. The shielding portion covers the pressure release valve from a side of the wall where the electrode assembly is located.

Therefore, during the nail penetration test, when the nail penetrates the electric storage device, the electrodes of different polarities are short-circuited in the case through the nail. When the short-circuiting occurs, heat is generated around the short-circuited part. This decomposes the electrolytic solution component and generates gas. The generation of gas raises the pressure in the electric storage device. When the internal pressure of the case reaches the release pressure of the pressure release valve, the pressure release valve is ripped open, and the gas in the case is released out of the case.

The high pressure gas generated in the short-circuited part is directed toward the ripped open pressure release valve. In this case, part of the electrode is scraped into fragments by the force of the generated gas. The shielding portion covers the ripped open pressure release valve from a side of the wall of the case where the electrode assembly is located. Thus, the gas discharged out of the electrode assembly strikes the shielding portion. This changes the direction of the gas directed toward the pressure release valve and lengthens the gas discharge path toward the pressure release valve. Furthermore, the gas has a longer gas discharge path as the gas flows along the rib. As a result, the fragments of the electrode fall out of the gas, and the fragments of the electrode are not scattered out of the case from the ripped open pressure release valve.

EMBODIMENTS OF THE INVENTION

First Embodiment

A first embodiment in which an electric storage device is embodied in a rechargeable battery will now be described with reference to FIGS. 1 to 6.

Figure 1:
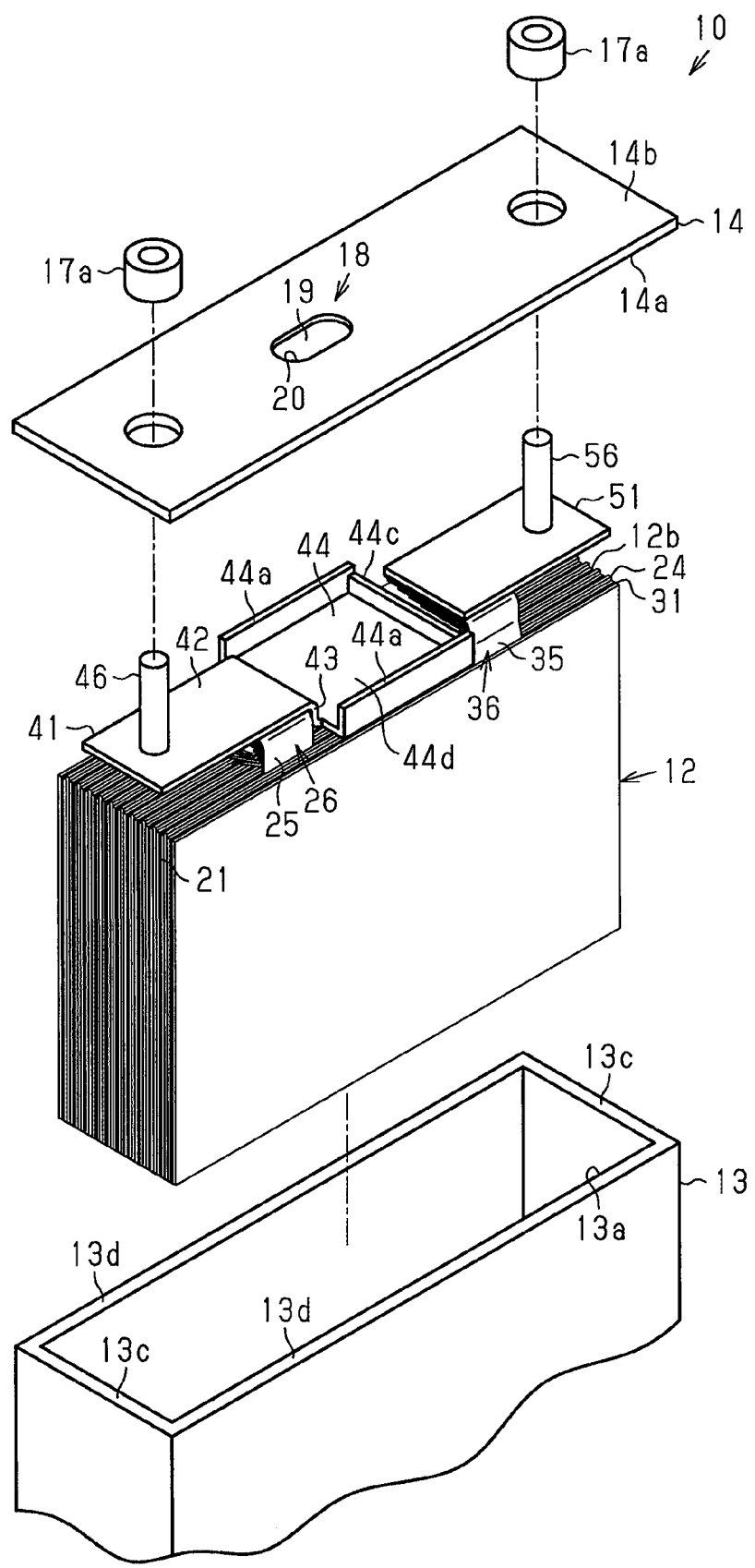
FIG. 1 is an exploded perspective view showing a rechargeable battery of a first embodiment.
Figure 2:
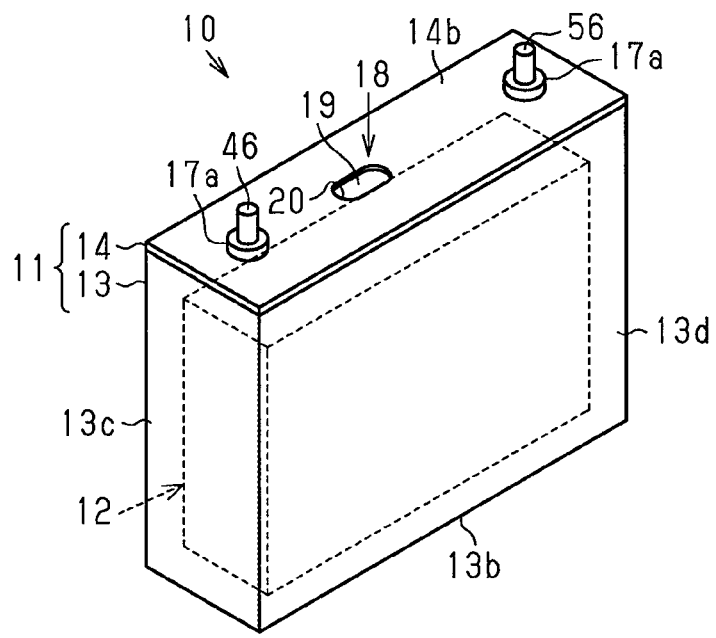
FIG. 2 is a perspective view showing the outside of the rechargeable battery of FIG. 1.

As shown in FIGS. 1 and 2, a rechargeable battery 10 serving as the electric storage device includes a case 11. The rechargeable battery 10 includes an electrode assembly 12, tab groups 26, 36, and electrolytic solution (not shown) accommodated in the case 11. The case 11 includes a case main body 13 having an opening 13a, and a lid body 14 that closes the opening 13a of the case main body 13. The lid body 14 has a rectangular shape in a plan view.

The case main body 13 and the lid body 14 are both made of aluminum. The case main body 13 includes a rectangular plate shaped bottom wall 13b, a short side wall 13c shaped to project from a short side of the bottom wall 13b, and a long side wall 13d shaped to project from a long side edge of the bottom wall 13b. The case 11 has a cuboid shape, and the electrode assembly 12 also has a cuboid shape in conformance with the case 11. The rechargeable battery 10 is a prismatic lithium ion battery.

The rechargeable battery 10 includes a pressure release valve 18 on the lid body 14. The pressure release valve 18 is located closer to one end than the middle in a longitudinal direction of the lid body 14. In other words, the pressure release valve 18 is located closer to a first end, which is one of the ends in the longitudinal direction of the lid body 14. The pressure release valve 18 is located at the middle in a short side direction of the lid body 14. When the lid body 14 is viewed from an outer surface 14b, the pressure release valve 18 has the forms of an elongated hole. In the present embodiment, the lid body 14 configures the wall of the case 11, that is, the wall where the pressure release valve 18 exists. The pressure release valve 18 is ripped open when the pressure in the case 11 reaches a release pressure, which is a predetermined pressure. When the pressure release valve 18 is ripped open, the pressure in the case 11 is released out of the case 11.

The release pressure of the pressure release valve 18 is set to a pressure that rips open the pressure release valve 18 before the case 11 or a joining portion of the case main body 13 and the lid body 14 cracks or breaks. The pressure release valve 18 includes a thin plate shaped valve body 19 that is thinner than the lid body 14. The valve body 19 is located at the bottom of a recess 20 that is recessed manner in the outer surface 14b of the lid body 14. The valve body 19 is molded integrally with the lid body 14.

Figure 3:
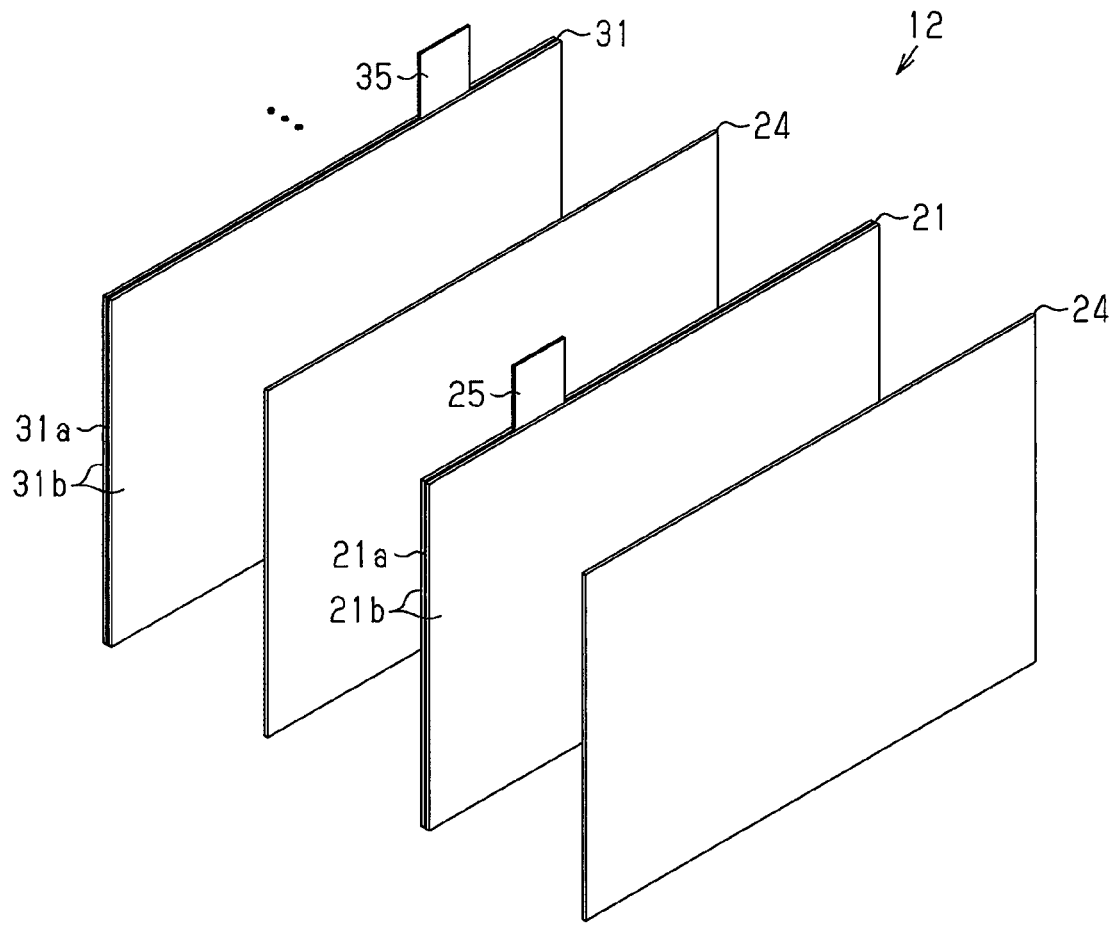
FIG. 3 is an exploded perspective view showing elements in an electrode assembly of the rechargeable battery of FIG. 1.

As shown in FIG. 3, the electrode assembly 12 includes a plurality of positive electrodes 21 having a rectangular sheet shape, and a plurality of negative electrodes 31 having a rectangular sheet shape. The polarity of the positive electrode 21 differs from that of the negative electrode 31. The positive electrode 21 includes a positive electrode metal foil (aluminum foil in the present embodiment) 21a serving as a metal foil, and a positive electrode active material layer 21b existing on both surfaces of the positive electrode metal foil 21a. The negative electrode 31 includes a negative electrode metal foil (copper foil in the present embodiment) 31a and a negative electrode active material layer 31b existing on both surfaces of the negative electrode metal foil 31a.

The electrode assembly 12 is of a stacked type in which separators 24 are located between the plurality of positive electrodes 21 and the plurality of negative electrodes 31 to obtain a layered structure. The separator 24 insulates the positive electrode 21 from the negative electrode 31 from each other. The positive electrode 21 includes a tab 25 shaped to project from part of one side of the positive electrode 21. The positive electrode tab 25 is an area where the positive electrode metal foil 21a is exposed, and an area where the positive electrode active material layer 21b does not exist. Thus, in the present embodiment, the positive electrode tab 25 is a non-coated portion of the positive electrode 21. The negative electrode 31 includes a tab 35 shaped to project from part of one side of the negative electrode 31. The negative electrode tab 35 is an area where the negative electrode metal foil 31a is exposed, and an area where the negative electrode active material layer 31b does not exist. Thus, in the present embodiment, the negative electrode tab 35 is a non-coated portion of the negative electrode 31.

An axis extending in the stacking direction of the electrodes 21, 31 is defined as an X axis, and an axis at right angle to the X axis and parallel with the lid body 14 (specifically, outer surface and inner surface of the lid body 14) is defined as a Y axis. Thus, the short side direction of the lid body 14 is a direction of the X axis, and the longitudinal direction of the lid body 14 is a direction of the Y axis.

As shown in FIG. 1, the plurality of positive electrode tabs 25 and the plurality of negative electrode tabs 35 do not overlap each other in a state where the positive electrode 21 and the negative electrode 31 are stacked. The electrode assembly 12 includes a tab side end face 12b. The tab side end face 12b is formed by gathering the sides of the projected positive electrodes 21 and negative electrodes 31 including the tabs 25, 35. The tab side end face 12b configures an end face of the electrode assembly 12 facing the inner surface 14a of the lid body 14. Here, the heightwise direction is the direction in which a straight line connecting the inner surface 14a of the lid body 14 and the tab side end face 12b of the electrode assembly 12 at a shortest distance is extended.

The rechargeable battery 10 includes a positive electrode tab group 26 shaped to project from the tab side end face 12b. The positive electrode tab group 26 is configured by gathering and stacking all of the positive electrode tabs 25 at one end side in the stacking direction of the electrode assembly 12. Thus, the positive electrode tab group 26 is a non-coated portion group in which the tabs 25, which are non-coated portions, of the plurality of positive electrodes 21 are stacked. The rechargeable battery 10 includes a negative electrode tab group 36 shaped to project from the tab side end face 12b. The negative electrode tab group 36 is configured by gathering and stacking all the negative electrode tabs 35 at one end side in the stacking direction of the electrode assembly 12. Thus, the negative electrode tab group 36 is a non-coated portion group in which the tabs 35, which are non-coated portions, of the plurality of negative electrodes 31 are stacked.

The rechargeable battery 10 includes a positive electrode conductive member 41 made of aluminum, and a negative electrode conductive member 51 made of copper. The positive electrode conductive member 41 and the negative electrode conductive member 51 entirely exist between the tab side end face 12b of the electrode assembly 12 and the inner surface 14a of the lid body 14. The positive electrode conductive member 41 and the negative electrode conductive member 51 are arranged next to each other in the longitudinal direction of the lid body 14. The positive electrode conductive member 41 is arranged closer to the first end in the longitudinal direction of the lid body 14, and the negative electrode conductive member 51 is arranged closer to the second end in the longitudinal direction of the lid body 14.

The positive electrode conductive member 41 is crank-shaped and integrally includes a positive electrode joining portion 42, a positive electrode coupling portion 43, and a positive electrode shielding portion 44. The positive electrode conductive member 41 arranged closer to the first end in the longitudinal direction of the lid body 14 includes the positive electrode shielding portion 44. Therefore, in the present embodiment, the positive electrode conductive member 41 is a first conductive member including the shielding portion, and the negative electrode conductive member 51 is a second conductive member not including the shielding portion.

The positive electrode joining portion 42 has a rectangular flat plate shape. The long side of the positive electrode joining portion 42 is extended in the longitudinal direction of the lid body 14. A positive electrode terminal 46 is joined with one end side in the longitudinal direction of the positive electrode joining portion 42, and the tab group 26 is joined with the other end side in the longitudinal direction of the positive electrode joining portion 42. Thus, the positive electrode conductive member 41 is electrically connected to the tab group 26, which is the non-coated portion of the positive electrode.

Figure 5:
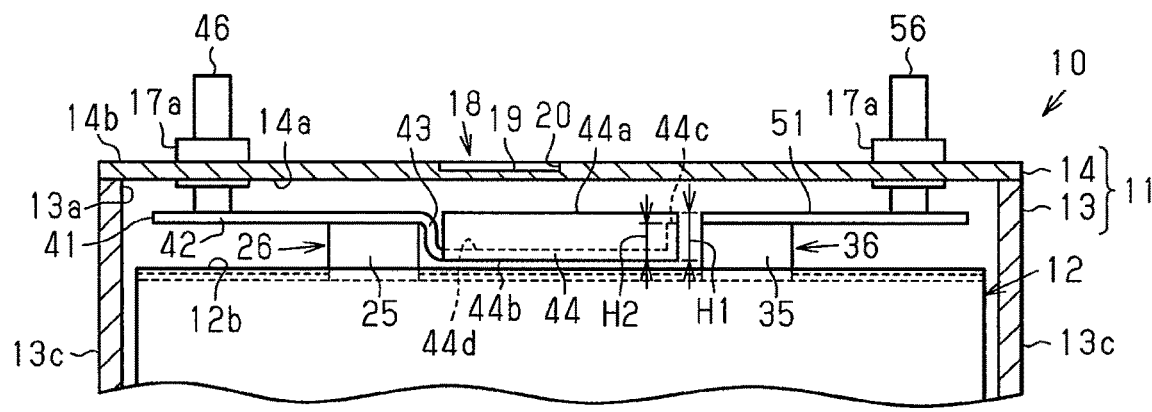
FIG. 5 is a partial cross-sectional view showing an internal structure of the rechargeable battery of FIG. 1.

As shown in FIGS. 1 and 5, the positive electrode coupling portion 43 has a rectangular plate shape. The positive electrode coupling portion 43 is shaped to project from the positive electrode joining portion 42 toward the tab side end face 12b of the electrode assembly 12. The positive electrode coupling portion 43 is orthogonal to the positive electrode joining portion 42. The positive electrode conductive member 41 is shaped bent toward the electrode assembly 12. The positive electrode coupling portion 43 is in a state lying along the side surface of the positive electrode tab group 26.

The positive electrode shielding portion 44 has a rectangular plate shape. The positive electrode shielding portion 44 is arranged along the tab side end face 12b of the electrode assembly 12. The positive electrode shielding portion 44 projects from the positive electrode coupling portion 43 in a direction opposite the positive electrode joining portion 42 along the longitudinal direction of the lid body 14. The positive electrode shielding portion 44 is parallel to the positive electrode joining portion 42. The positive electrode shielding portion 44 is closer to the electrode assembly 12 than the positive electrode joining portion 42. Thus, the positive electrode shielding portion 44 is farther from the lid body 14 than the positive electrode joining portion 42.

The positive electrode joining portion 42 and the positive electrode coupling portion 43 of the positive electrode conductive member 41 configure an interposing portion. The interposing portion is an area located between the tab side end face 12b and the inner surface 14a of the lid body 14 in the positive electrode conductive member 41. The positive electrode shielding portion 44 is an area closer to the tab side end face 12b than the positive electrode joining portion 42 and the positive electrode coupling portion 43.

Figure 6:
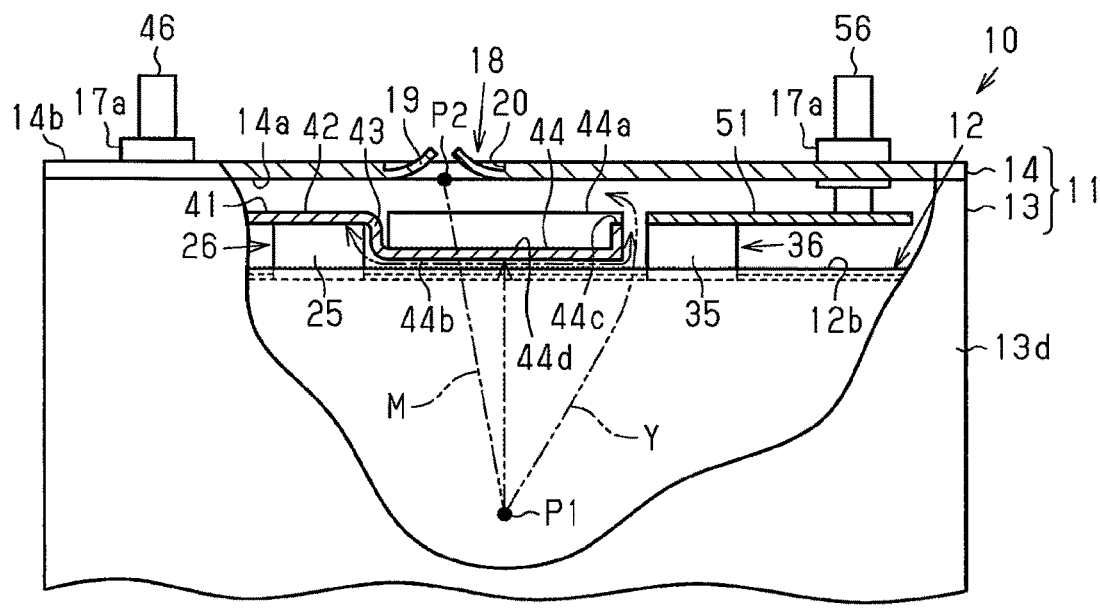
FIG. 6 is a partially cutaway front view showing the rechargeable battery of FIG. 1 during a nail penetration test.

As shown in FIG. 6, a position where two diagonal lines in the front view of the case 11 intersect is referred to as the middle in a front view. At the middle in the front view, a point located at the center in the stacking direction of the electrodes 21, 31 in the electrode assembly 12 is a center point P1. A straight line connecting the center point P1 and a center point P2 of the valve body 19 in the pressure release valve 18 is referred to as a straight line M. In this case, the positive electrode shielding portion 44 exists on the straight line M and covers the entire pressure release valve 18 from the side of the lid body (wall) 14 where the electrode assembly 12 is located.

Figure 4:
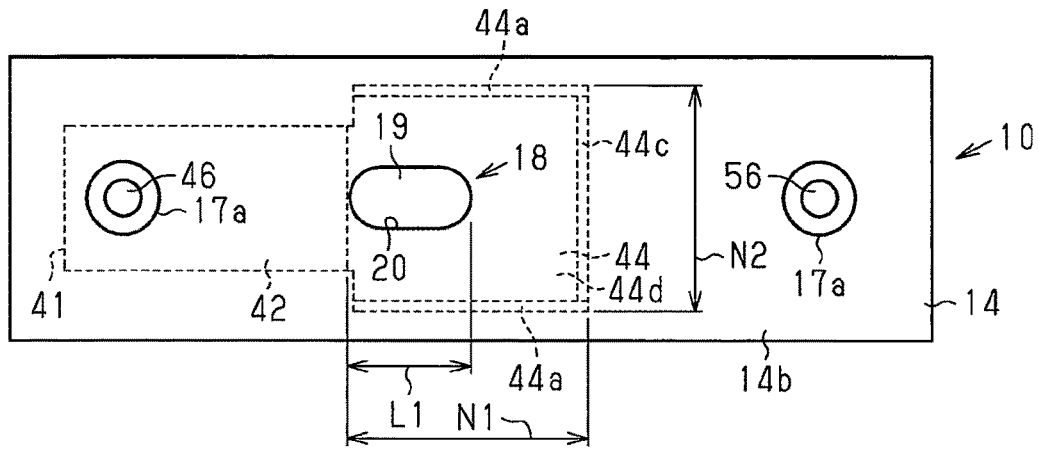
FIG. 4 is a plan view showing the rechargeable battery of FIG. 1.

As shown in FIG. 4, a dimension N1 in the projecting direction of the positive electrode shielding portion 44 from the positive electrode coupling portion 43 is longer than a dimension L1 in the longitudinal direction of the pressure release valve 18. An end closer to the positive electrode coupling portion 43 in the positive electrode shielding portion 44 is a basal end, and an end directed toward the projecting direction from the positive electrode coupling portion 43 is a distal end. As viewed from the outer surface 14b of the lid body 14, the basal end of the positive electrode shielding portion 44 is located at the same position as one longitudinal end of the pressure release valve 18. Furthermore, as viewed from the outer surface 14b of the lid body 14, the distal end of the positive electrode coupling portion 43 is located beyond the other end in the longitudinal direction of the pressure release valve 18. Thus, in the longitudinal direction of the lid body 14, the pressure release valve 18 is closer to the basal end (positive electrode coupling portion 43) than the distal end of the positive electrode shielding portion 44.

A direction that lies along the surface of the positive electrode shielding portion 44 and is orthogonal to the longitudinal direction of the positive electrode shielding portion 44 is a widthwise direction of the positive electrode shielding portion 44. A dimension N2 that lies along the widthwise direction of the positive electrode shielding portion 44 is slightly shorter than the length of the straight line connecting the inner surfaces of the short side walls 13c at the shortest distance. Thus, both widthwise ends of the positive electrode shielding portion 44 are slightly spaced apart from the inner surface of the long side walls 13d of the case 11.

The positive electrode conductive member 41 includes a pair of first ribs 44a. Each first rib 44a has a shape projecting toward the lid body 14 from each long side of the positive electrode shielding portion 44 extending along the longitudinal direction of the lid body 14. The first rib 44a is shaped so that the long side extends in the longitudinal direction of the lid body 14.

As shown in FIGS. 1 and 5, in the positive electrode shielding portion 44, a surface facing the tab side end face 12b is an outer surface 44b, and a surface facing the inner surface 14a of the lid body 14 is an inner surface 44d. The outer surface 44b of the positive electrode shielding portion 44 is spaced apart from the tab side end face 12b in the height-wise direction. Furthermore, the inner surface 44d of the positive electrode shielding portion 44 has a flat planar shape. In the first rib 44a, a distal end face in the projecting direction from the positive electrode shielding portion 44 is spaced apart from the inner surface 14a of the lid body 14.

The positive electrode conductive member 41 includes a second rib 44c on the positive electrode shielding portion 44. The second rib 44c is shaped to project toward the lid body 14 from an edge closer to the negative electrode conductive member 51 of the edges extending in the short side direction of the lid body 14, that is, the widthwise direction of the positive electrode shielding portion 44. The long side of the second rib 44c extends along the stacking direction of the electrode assembly 12.

Among the dimensions in the projecting direction of the first rib 44a, the dimension from the outer surface 44b of the positive electrode shielding portion 44 is referred to as a projecting distance H1. Furthermore, among the dimensions in the projecting direction of the second rib 44c, the dimension from the outer surface 44b of the positive electrode shielding portion 44 is referred to as a projecting distance H2. The projecting distance H2 of the second rib 44c is shorter than the projecting distance H1 of the first rib 44a. This obtains a flow path for the gas flowing into between the distal end of the second rib 44c and the lid body 14 from the side where the negative electrode conductive member 51 is located.

The negative electrode conductive member 51 has a rectangular flat plate shape. The long side of the negative electrode conductive member 51 is extended in the longitudinal direction of the lid body 14. The negative electrode tab group 36 is joined with one longitudinal end of the negative electrode conductive member 51. A negative electrode terminal 56 is joined with the other longitudinal end of the negative electrode conductive member 51. Thus, the negative electrode conductive member 51 is electrically connected to the negative electrode tab group 36.

One longitudinal end face of the negative electrode conductive member 51 and a distal end face of the positive electrode shielding portion 44 of the positive electrode conductive member 41 are spaced apart in the longitudinal direction of the lid body 14, and part of the tab side end face 12b is exposed from between the faces. In other words, even when the positive electrode conductive member 41 and the negative electrode conductive member 51 are arranged next to each other in the longitudinal direction of the lid body 14, the positive electrode conductive member 41 and the negative electrode conductive member 51 do not overlap in the height-wise direction.

The positive electrode terminal 46 and the negative electrode terminal 56 extend through the lid body 14 and are partially exposed to the outside of the case 11. Furthermore, a ring-shaped insulating member 17a for insulation from the case 11 is attached to the positive electrode terminal 46 and the negative electrode terminal 56, respectively.

The operation of the rechargeable battery 10 will now be described.

As shown in FIG. 6, when a nail penetrates the middle of the case 11 in a front view of the rechargeable battery 10 to carry out the nail penetration test, the nail extends through the electrode assembly 12 in the stacking direction. The separator 24 between the positive electrode 21 and the negative electrode 31 is thus broken or melted by the nail, and the positive electrode 21 and the negative electrode 31 are short-circuited in the case 11.

When the short-circuiting occurs in the electrode assembly 12, heat is generated around the short-circuited part. This decomposes the electrolytic solution component and generates gas. The generation of gas raises the pressure in the rechargeable battery 10. When the internal pressure of the case 11 reaches the release pressure of the pressure release valve 18, the valve body 19 of the pressure release valve 18 is ripped open, and the gas in the case 11 is released out of the case 11.

As shown by arrow Y of a double-dashed line, the high pressure gas generated at the short-circuited part rises toward the pressure release valve 18. Parts of the electrodes 21, 31 and the metal foils 21a, 31a are scraped into fragments by the force of the generated gas. The gas passes between the layers of the electrode assembly 12 and flows out of the electrode assembly 12 from the tab side end face 12b. The gas directed toward the pressure release valve 18 from the center point P1 of the gases strikes the outer surface 44b of the positive electrode shielding portion 44 and changes in direction along the outer surface 44b of the positive electrode shielding portion 44.

The gas changed in direction when striking the positive electrode shielding portion 44 and flowing in the stacking direction rises along the first rib 44a and passes through a gap between the distal end face of the first rib 44a and the inner surface 14a of the lid body 14 to reach the pressure release valve 18.

The gas that flows toward a side where the positive electrode terminal 46 is located cannot flow over the positive electrode shielding portion 44 because of the positive electrode coupling portion 43, and after rising along the positive electrode coupling portion 43, reaches the pressure release valve 18 from the positive electrode shielding portion 44. The gas that flows toward the negative electrode terminal 56 passes between the second rib 44c and the lid body 14 to reach the pressure release valve 18. Thus, the gas flows from every location at the periphery of the pressure release valve 18 toward the pressure release valve 18. Therefore, a gas path exists at any position along the inner surface 44d of the positive electrode shielding portion 44. In the present embodiment, the outer surface of the first rib 44a is a surface orthogonal to the gas path directed toward the pressure release valve 18 along the short side direction of the lid body 14, and the second rib 44c and the positive electrode coupling portion 43 are surfaces orthogonal to the gas path directed toward the pressure release valve 18 along the longitudinal direction of the lid body 14.

The embodiment described above has the following advantages.

(1) The positive electrode shielding portion 44 of the positive electrode conductive member 41 covers the pressure release valve 18 from a side with of the lid body (wall) 14 where the electrode assembly 12 is located. Thus, during the nail penetration test, the gas directed toward the pressure release valve 18 strikes the outer surface 44*b* of the positive electrode shielding portion 44 to deviate the flowing direction of the gas from the discharge path directed straightly toward the pressure release valve 18. The gas of which direction is changed has a longer gas discharge path. Thus, the fragments of the electrodes 21, 31 and the metal foils 21*a*, 31*a* in the gas fall into the case 11 because of the longer gas discharge path when striking the positive electrode shielding portion 44. Thus, the fragments in the gas are not emitted from the case 11, the fragments are not scattered outside the case 11, and the generation of sparks is reduced.

Furthermore, the positive electrode shielding portion 44 is located closer to the tab side end face 12*b* of the electrode assembly 12 than the positive electrode joining portion 42 and the positive electrode coupling portion 43, which are interposing portions closer to the lid body 14. Thus, the flow path of the gas directed toward the pressure release valve 18 is not constricted even when the pressure release valve 18 is covered by the positive electrode shielding portion 44. Further, sparks are not scattered outside the case 11, and a flow path is obtained for the gas to the pressure release valve 18.

(2) The positive electrode shielding portion 44 is arranged on the positive electrode conductive member 41. The positive electrode conductive member 41 is made of aluminum same as the case 11. Thus, even when the positive electrode shielding portion 44 is in contact with the case 11, electrical corrosion does not occur. The positive electrode shielding portion 44 can thus be enlarged in the widthwise direction to increase the area covering the tab side end face 12*b* and the pressure release valve 18 with the positive electrode shielding portion 44. Thus, most of the gas directed toward the pressure release valve 18 strikes the positive electrode shielding portion 44.

Furthermore, since the positive electrode shielding portion 44 is made of aluminum, costs are not increased even when the positive electrode shielding portion 44 is enlarged to widely cover the tab side end face 12*b* and the pressure release valve 18.

(3) The pressure release valve 18 is arranged closer to the positive electrode conductive member 41 in the longitudinal direction of the lid body 14, and the positive electrode conductive member 41 includes the positive electrode shielding portion 44. When viewing the lid body 14 from the outer surface 14*b*, the distal end of the positive electrode shielding portion 44 is located beyond the pressure release valve 18 in the longitudinal direction of the lid body 14. Thus, the gas is separated from the pressure release valve 18, and the gas discharge path to the pressure release valve 18 is lengthened by having the gas flow along the outer surface 44*b* of the positive electrode shielding portion 44. As a result, the fragments of the electrodes 21, 31 and the metal foils 21*a*, 31*a* easily fall out of from the gas, and the scattering of sparks the outside the case 11 is further reduced.

(4) The first rib 44*a* of the positive electrode shielding portion 44 is located on both end sides of the electrode assembly 12 in the stacking direction. During the nail penetration test, the electrode assembly 12 expanded in the stacking direction as the temperature rises, and gas flows toward the pressure release valve 18 from both sides of the electrode assembly 12 in the stacking direction. The gas strikes the first rib 44*a*, and parts of the electrodes 21, 31 and the metal foils 21*a*, 31*a* fall out of the gas.

(5) The positive electrode shielding portion 44 includes the second rib 44*c* extending in the short side direction of the lid body 14 (stacking direction of the electrode assembly 12). Thus, even when the gas flows from the side where the negative electrode conductive member 51 is located to the positive electrode shielding portion 44, the gas strikes the second rib 44*c*, and parts of the electrodes 21, 31 and the metal foils 21*a*, 31*a* fall out of the gas.

(6) In the positive electrode conductive member 41 and the negative electrode conductive member 51 arranged next to each other in the longitudinal direction of the lid body 14, the conductive members 41, 51 of both polarities are not overlapped in the height-wise direction. Thus, the positive electrode conductive member 41 and the negative electrode conductive member 51 are not in contact and not short-circuited even of the rechargeable battery 10 vibrates or the gas strikes the positive electrode shielding portion 44.

Second Embodiment

Next, a second embodiment embodying the electric storage device in a rechargeable battery will be described according to FIGS. 7 to 9. In the second embodiment, detailed description of portions similar to the configuration of the first embodiment will be omitted.

Figure 7:
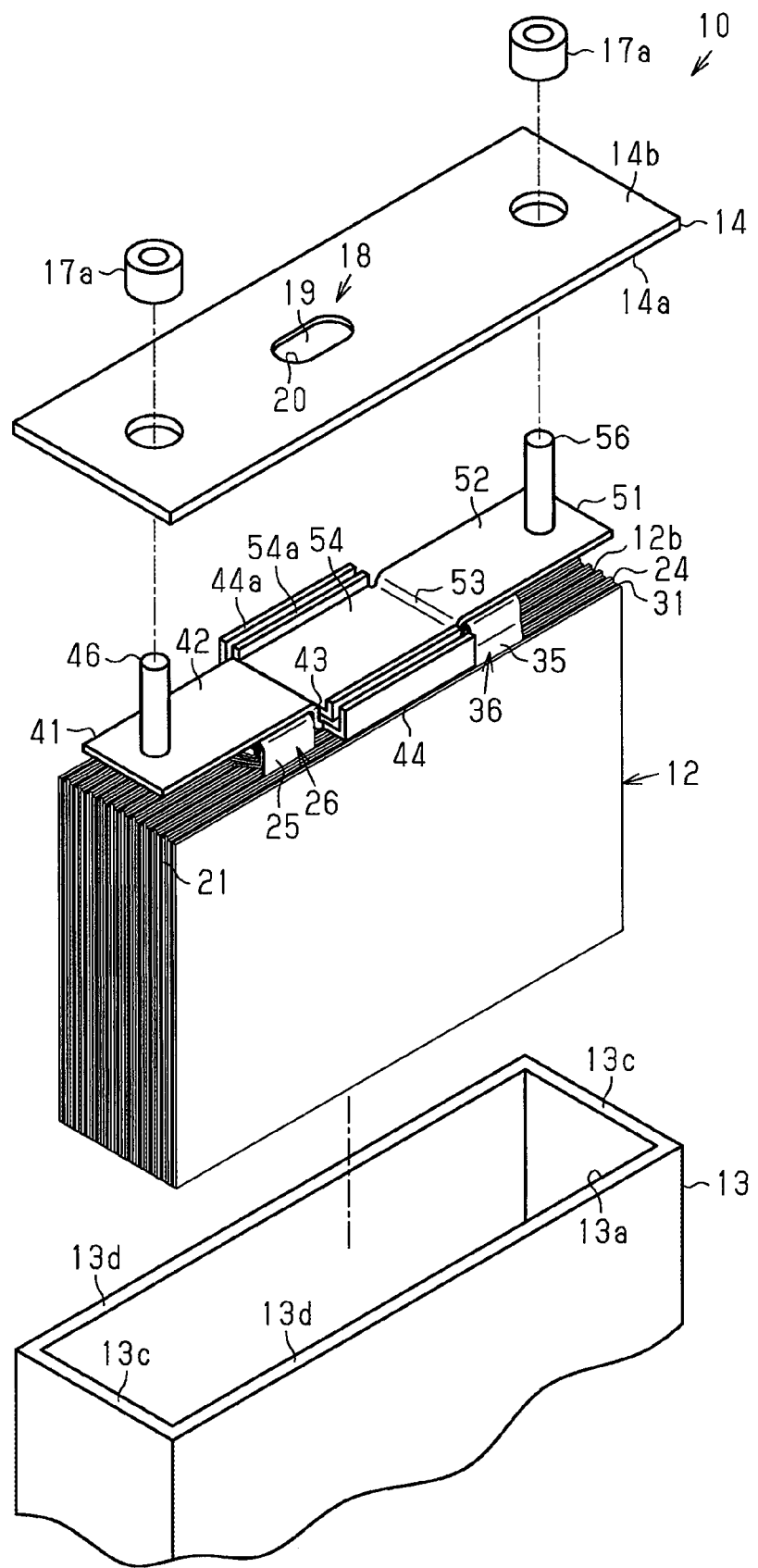
FIG. 7 is an exploded perspective view showing a rechargeable battery of a second embodiment.
Figure 8:
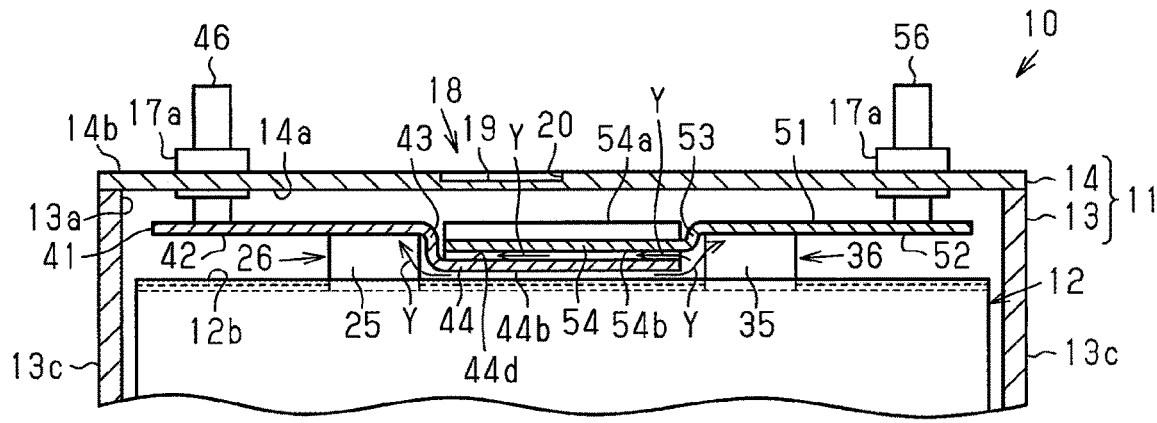
FIG. 8 is a partial cross-sectional view showing an internal structure of the rechargeable battery of FIG. 7.
Figure 9:
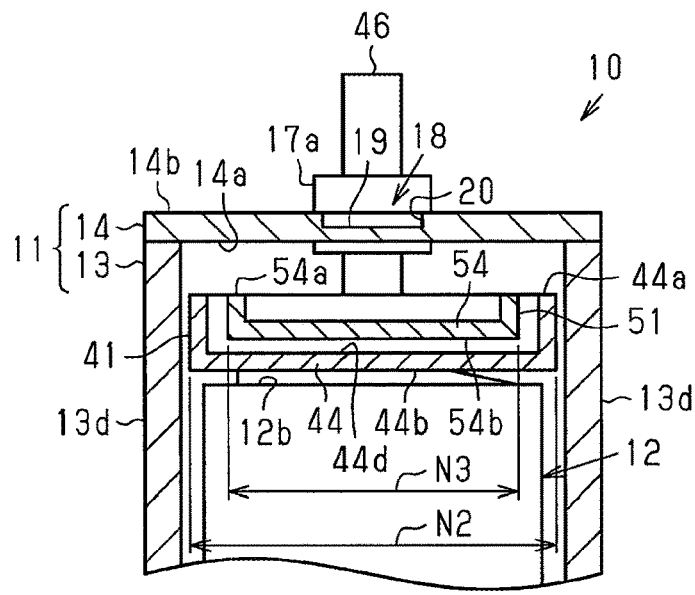
FIG. 9 is a partial cross-sectional view showing an internal structure of the rechargeable battery of FIG. 7.

As shown in FIGS. 7 and 8, the negative electrode conductive member 51 is crank-shaped and integrally includes a negative electrode joining portion 52, a negative electrode coupling portion 53, and a negative electrode shielding portion 54. The negative electrode joining portion 52 has a rectangular flat plate shape. The long side of the negative electrode joining portion 52 is extended in the longitudinal direction of the lid body 14. The negative electrode tab group 36 is joined with one longitudinal end in the direction of the negative electrode joining portion 52, and the negative electrode terminal 56 is joined with the other longitudinal end in the direction of the negative electrode joining portion 52. Thus, the negative electrode conductive member 51 is electrically connected to the tab group 36, which is the non-coated portion of the negative electrode.

The negative electrode coupling portion 53 has a rectangular plate shape. The negative electrode coupling portion 53 is shaped to project from the negative electrode joining portion 52 toward the tab side end face 12*b* of the electrode assembly 12. The negative electrode conductive member 51 is shaped bent toward the electrode assembly 12. The negative electrode coupling portion 53 is orthogonal to the negative electrode joining portion 52. The negative electrode coupling portion 53 extends along the side surface of the negative electrode tab group 36.

The negative electrode shielding portion 54 has a rectangular plate shape. The negative electrode shielding portion 54 projects from the negative electrode coupling portion 53 in a direction opposite the negative electrode joining portion 52 along the longitudinal direction of the lid body 14. The negative electrode shielding portion 54 is parallel to the negative electrode joining portion 52. Furthermore, the negative electrode shielding portion 54 is closer to the electrode assembly 12 than the negative electrode joining portion 52. Thus, the negative electrode shielding portion 54 is farther from the lid body 14 than the negative electrode joining portion 52.

The negative electrode joining portion 52 and the negative electrode coupling portion 53 of the negative electrode conductive member 51 configure an interposing portion. The interposing portion is an area located between the tab side end face 12*b* and the inner surface 14*a* of the lid body 14 in the negative electrode conductive member 51. The negative electrode shielding portion 54 is an area closer to the tab side end face 12b than the negative electrode joining portion 52 and the negative electrode coupling portion 53.

The negative electrode joining portion 52 is located at the same height as the positive electrode joining portion 42 of the positive electrode conductive member 41. The projection length of the negative electrode coupling portion 53 from the negative electrode joining portion 52 toward the electrode assembly 12 is shorter than the projection length of the positive electrode coupling portion 43 from the positive electrode joining portion 42. Thus, the negative electrode shielding portion 54 is located closer to the lid body 14 than the positive electrode shielding portion 44, and the positive electrode shielding portion 44 overlaps the negative electrode shielding portion 54 in the height-wise direction.

In the negative electrode shielding portion 54, a surface facing the positive electrode shielding portion 44 is referred to as an outer surface 54b. The outer surface 54b is spaced apart from the positive electrode shielding portion 44 in the height-wise direction, and a gas flow path is obtained between the positive electrode shielding portion 44 and the negative electrode shielding portion 54. The outer surface 54b of the negative electrode shielding portion 54 has a flat planar shape.

A direction that extends along the surface of the negative electrode shielding portion 54 and is orthogonal to the longitudinal direction of the negative electrode shielding portion 54 is referred to as a widthwise direction of the negative electrode shielding portion 54. As shown in FIG. 9, a dimension N3 in the widthwise direction of the negative electrode shielding portion 54 is shorter than the dimension N2 in the widthwise direction of the positive electrode shielding portion 44. The negative electrode conductive member 51 includes a negative electrode rib 54a shaped to project toward the lid body 14 from two long sides of the negative electrode shielding portion 54. The negative electrode rib 54a is shaped so that the long side extends in the longitudinal direction of the lid body 14. In the widthwise direction of the negative electrode shielding portion 54, the first rib 44a of the positive electrode shielding portion 44 is located outward from the negative electrode rib 54a. In the widthwise direction of the negative electrode shielding portion 54, the negative electrode rib 54a and the first rib 44a are spaced apart. A distal end face in the projecting direction of the negative electrode rib 54a from the negative electrode shielding portion 54 is slightly spaced apart from the inner surface 14a of the lid body 14. The distal end face of the first rib 44a and the distal end face of the negative electrode rib 54a are located at the same height.

Next, the operation of the rechargeable battery 10 will be described.

During the nail penetration test, the high pressure gas generated in the short-circuited part rises toward the pressure release valve 18. The gas is discharged to the outside of the electrode assembly 12 from the tab side end face 12b.

As shown by arrow Y in FIG. 8, the gas directed toward the pressure release valve 18 strikes the outer surface 44b of the positive electrode shielding portion 44 and is changed in direction along the outer surface 44b of the positive electrode shielding portion 44. The gas that is changed in direction when striking the positive electrode shielding portion 44 and flowing in the widthwise direction of the positive electrode shielding portion 44 rises along the first rib 44a and passes through a gap between the distal end face of the first rib 44a and the inner surface 14a of the lid body 14 to reach the pressure release valve 18.

The gas that flows toward the side where the positive electrode terminal 46 is located rises along the positive electrode coupling portion 43 and reaches the pressure release valve 18 from the positive electrode shielding portion 44. The gas that flows toward the side where the negative electrode terminal 56 is located flows between the positive electrode shielding portion 44 and the negative electrode shielding portion 54, rises along the negative electrode shielding portion 54 and the negative electrode rib 54a, and reaches the pressure release valve 18. Then, the gas is discharged out of the case 11 from the ripped open pressure release valve 18.

Therefore, the second embodiment has the following advantage in addition to the advantages of the first embodiment.

(7) The pressure release valve 18 is covered by two portions, namely, the positive electrode shielding portion 44 and the negative electrode shielding portion 54, and the positive electrode shielding portion 44 and the negative electrode shielding portion 54 are spaced apart in the height-wise direction. The gas that strikes the positive electrode shielding portion 44 and flows to the side where the negative electrode terminal 56 is located flows between the positive electrode shielding portion 44 and the negative electrode shielding portion 54 to reach the pressure release valve 18. Thus, the discharge path of the gas directed toward the pressure release valve 18 is lengthened. In addition, the gas that flows toward the positive electrode coupling portion 43 along the positive electrode shielding portion 44 is less likely to flow toward the pressure release valve 18 because of the positive electrode coupling portion 43, and the discharge path of the gas is lengthened. Thus, the fragments of the electrodes 21, 31 and the fragments of the metal foils 21a, 31a in the gas fall into the case 11, the fragments are not discharged with the gas out of the case 11, and the generation of sparks is reduced.

The embodiment described above may be modified as below.

Figure 10:
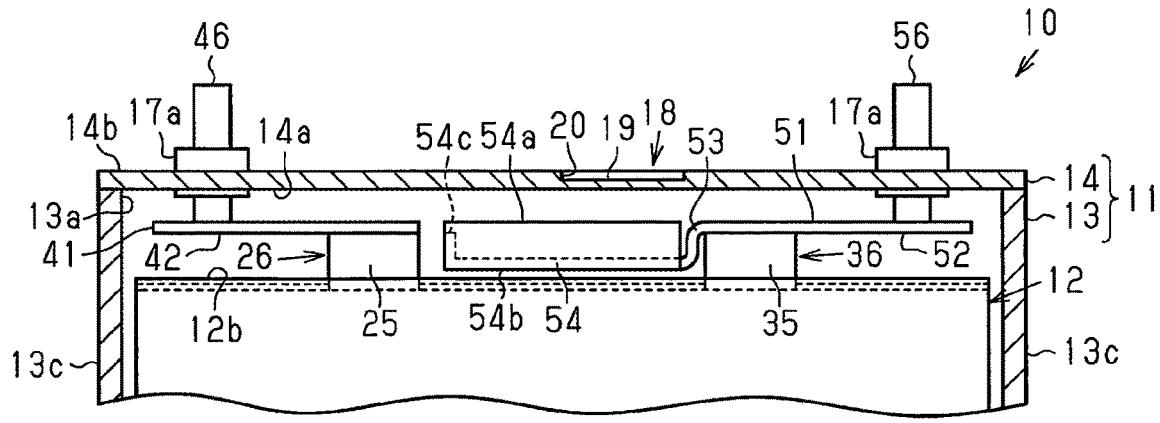
FIG. 10 is a partial cross-sectional view showing a rechargeable battery of a further example.

As shown in FIG. 10, the shielding portion covering the pressure release valve 18 may be only the negative electrode shielding portion 54 of the negative electrode conductive member 51. In this case, the pressure release valve 18 is arranged closer to the second end in the longitudinal direction of the lid body 14, and the negative electrode conductive member 51 arranged closer to the second end in the longitudinal direction of the lid body 14 includes the negative electrode shielding portion 54. The negative electrode conductive member 51 is a first conductive member including the shielding portion, and the positive electrode conductive member 41 is a second conductive member not including the shielding portion. Furthermore, a rib 54c may be arranged at the short side of the negative electrode shielding portion 54.

When configured in such manner, even when the gas strikes the negative electrode shielding portion 54 that is made of copper, the negative electrode shielding portion 54 is not melted or being scraped by the high temperature gas. As a result, parts of the negative electrode shielding portion 54 are not released from the case 11 with the gas, and sparks are not generated.

Figure 11:
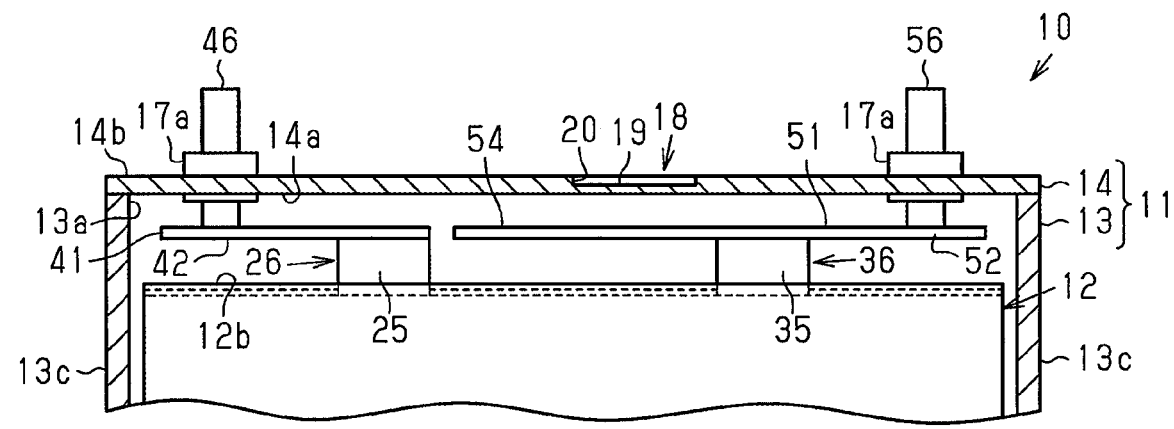
FIG. 11 is a partial cross-sectional view showing a rechargeable battery of a further example.

As shown in FIG. 11, the negative electrode conductive member 51 does not include the negative electrode coupling portion 53 bent from the negative electrode joining portion 52, and a flat negative electrode shielding portion 54 is arranged to be flush with the negative electrode joining portion 52.

When configured in such manner, during the nail penetration test, the gas directed toward the pressure release valve 18 strikes the negative electrode shielding portion 54, and the flowing direction of the gas can be deviated from the discharge path directed straightly toward the pressure release valve 18. The gas of which direction is changed has a longer gas discharge path. Thus, the fragments of the electrodes 21, 31 and the metal foils 21a, 31a in the gas fall into the case 11 due to the longer gas discharge path when striking the negative electrode shielding portion 54. Thus, the fragments in the gas are not discharged out of the case 11, and the generation of sparks is reduced.

In FIG. 11, a configuration in which the flat shielding portion is arranged in the negative electrode conductive member 51 is employed. However, the negative electrode coupling portion 53 and the negative electrode shielding portion 54 of the negative electrode conductive member 51 may be eliminated, and the flat shielding portion may be arranged in the positive electrode conductive member 41. In this case, the positive electrode coupling portion 43 bent from the positive electrode joining portion 42 is not included, and the flat positive electrode shielding portion 44 is arranged to be flush with the positive electrode joining portion 42 in the positive electrode conductive member 41.

Figure 12:
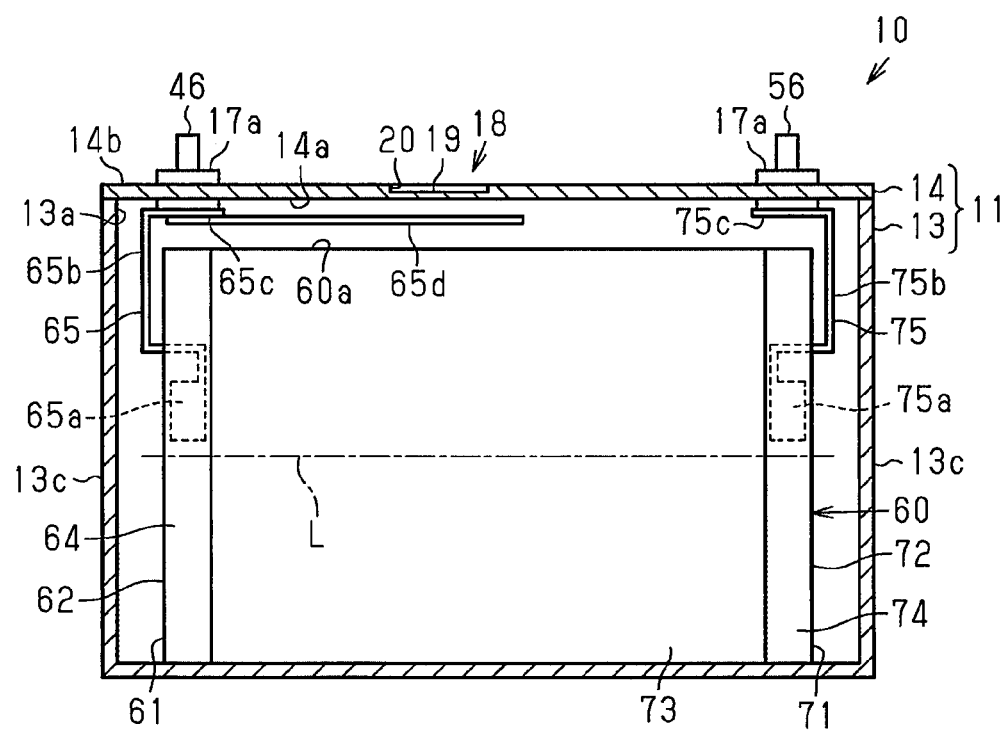
FIG. 12 is a partial cross-sectional view showing a rechargeable battery of a further example.

As shown in FIG. 12, an electrode assembly 60 may be a winding type in which one long band shaped positive electrode 61, a long band shaped separator (not shown), and one long band shaped negative electrode 71 are wound into a spiral form of which the center is a winding axis L. The positive electrode 61 includes a positive electrode active material layer existing on both surfaces of a band shaped metal foil 62, and an exposed positive electrode non-coated portion 64 of the metal foil 62. The negative electrode 71 includes a negative electrode active material layer 73 existing on both surfaces of a band shaped metal foil 72 and an exposed negative electrode non-coated portion 74 of the metal foil 72.

In the electrode assembly 60, the positive electrode non-coated portion 64 is located at one end in an extending direction of the winding axis L. In the electrode assembly 60, the negative electrode non-coated portion 74 is located at the other end in the extending direction of the winding axis L. A distal end of the positive electrode conductive member 65 is electrically connected to the positive electrode non-coated portion 64 of the electrode assembly 60. The positive electrode conductive member 65 is formed by folding back a substantially rectangular flat plate through, for example, pressing of the like.

The positive electrode conductive member 65 includes a rectangular flat plate shaped positive electrode joining portion 65a electrically connected to the positive electrode non-coated portion 64. Furthermore, the positive electrode conductive member 65 includes a positive electrode conductive portion 65b arranged continuously with the positive electrode joining portion 65a and extending toward the lid body 14. Furthermore, the positive electrode conductive member 65 includes an interposing portion 65c arranged continuously with the positive electrode conductive portion 65b and located between the inner surface 14a of the lid body 14 and an end face 60a of the electrode assembly 60 facing the inner surface 14a. The positive electrode terminal 46 is electrically connected to the interposing portion 65c.

Furthermore, the positive electrode conductive member 65 includes a shielding portion 65d at a position closer to the electrode assembly 12 than the interposing portion 65c, and the shielding portion 65d covers the pressure release valve 18 from a side of the lid body 14 where the electrode assembly 60 is located. The shielding portion 65d is located between the inner surface 14a of the lid body 14 and the end face 60a of the electrode assembly 60 facing the inner surface 14a. The shielding portion 65d is separate from the interposing portion 65c in the positive electrode conductive member 65.

A distal end of the negative electrode conductive member 75 is electrically connected to the negative electrode non-coated portion 74 of the electrode assembly 60. The negative electrode conductive member 75 is formed by folding back a substantially rectangular flat plate through, for example, pressing or the like.

The negative electrode conductive member 75 includes a rectangular flat plate shaped negative electrode joining portion 75a electrically connected to the negative electrode non-coated portion 74. Furthermore, the negative electrode conductive member 75 includes a negative electrode conductive portion 75b arranged continuously with the negative electrode joining portion 75a and extending toward the lid body 14. Furthermore, the negative electrode conductive member 75 includes an interposing portion 75c arranged continuously with the negative electrode conductive portion 75b and located between the inner surface 14a of the lid body 14 and the end face 60a of the electrode assembly 60 facing the inner surface 14a. The negative electrode terminal 56 is electrically connected to the interposing portion 75c.

The negative electrode conductive member 75 may include a shielding portion.

The shielding portion 65d continuous with the interposing portion 65c may be provided by folding back the positive electrode conductive member 65. Furthermore, the shielding portion 65d may include a first rib 44a and a second rib 44c.

Figure 13:
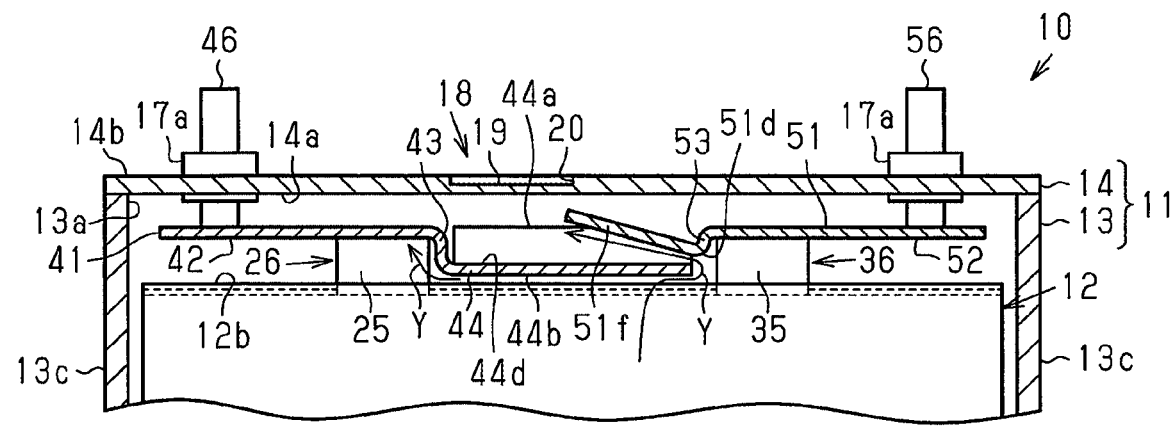
FIG. 13 is a partial cross-sectional view showing a negative electrode conductive member including a bent portion.

In the first embodiment, as shown in FIG. 13, the negative electrode conductive member 51 includes a portion located closer to the lid body 14 than the positive electrode shielding portion 44 in the height-wise direction. In this case, the positive electrode shielding portion 44 and part of the negative electrode conductive member 51 overlap each other in the height-wise direction, and the negative electrode conductive member 51 includes an extending portion 51f located closer to the positive electrode conductive member 41 than the tab group 36 at the portion where they overlap each other. The negative electrode conductive member 51 may include a bent portion 51d bent toward the lid body 14 so that the distal end of the extending portion 51f is directed toward the edge of the pressure release valve 18. The bent portion 51d may be at any position as long as it is at a position closer to the positive electrode conductive member 41 than a welding portion of the tab group 36 and the negative electrode conductive member 51. Furthermore, the extending portion 51f does not cover the pressure release valve 18.

When configured in such manner, the gas changed in direction when striking the positive electrode shielding portion 44 and flowing to a side where the negative electrode conductive member 51 is located, as shown by arrow Y, passes between the opposing surfaces of the extending portion 51f and the positive electrode shielding portion 44 and is thus directed toward the pressure release valve 18 along the extending portion 51f. Since the distal end of the extending portion 51f is arranged to face the edge of the pressure release valve 18, the gas flowing along the extending portion 51f flows toward the pressure release valve 18. As a result, the gas does not strike the lid body 14 in the periphery of the pressure release valve 18, and the periphery of the pressure release valve 18 in the lid body 14 thus does not melt. The positive electrode shielding portion 44 of the positive electrode conductive member 41 may be eliminated, the negative electrode shielding portion 54 of the negative electrode conductive member 51 may be arranged, and the extending portion 51f and the bent portion 51d may be arranged in the positive electrode conductive member 41.

Figure 14:
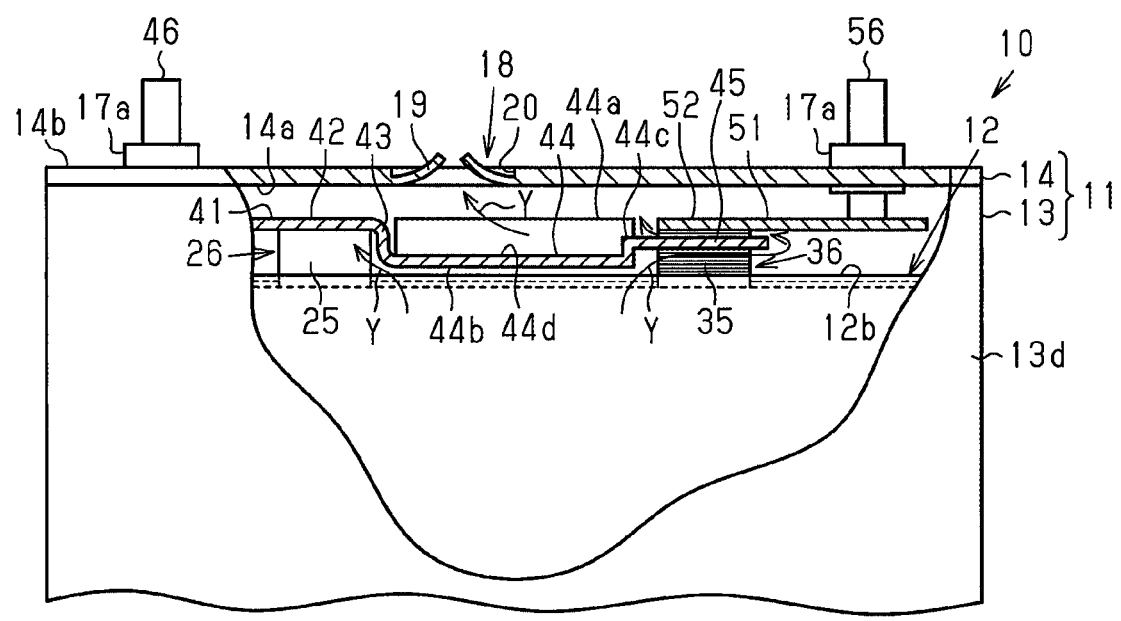
FIG. 14 is a partial cross-sectional view showing a positive electrode conductive member including an overlapping portion.

In the first embodiment, as shown in FIG. 14, the positive electrode shielding portion 44 may include an overlapping portion 45 overlapping the negative electrode joining portion 52 of the negative electrode conductive member 51 in the height-wise direction. The overlapping portion 45 is arranged in a state where a gap forms between the overlapping portion 45 and the negative electrode joining portion 52 in the height-wise direction. The overlapping portion 45 is located between the opposing surfaces of the tab group 36 folded in two. In other words, the overlapping portion 45 of the positive electrode conductive member 41 overlaps the negative electrode tab 35 of a different polarity as viewed from the outer surface 14b of the lid body 14. Furthermore, the overlapping portion 45 covers the portion beyond the folded-back portion from the side where the electrode assembly 12 is located with respect to the lid body 14 in the tab group 36.

The overlapping portion 45 projects closer to the negative electrode terminal 56 than the negative electrode tab group 36 in the longitudinal direction of the lid body 14. A coating of an insulative resin, ceramic, or the like is applied to the overlapping portion 45 for insulation from the tab group 36.

In such a configuration, when gas is discharged from between the negative electrode tabs 35 that are adjacent in the stacking direction, the gas strikes the overlapping portion 45, and the electrode fragments fall out of the gas.

Furthermore, as shown by arrow Y, during the nail penetration test, the gas directed toward the pressure release valve 18 strikes the positive electrode shielding portion 44, and furthermore, the gas flows to the side where the negative electrode terminal 56 is located along the overlapping portion 45. Thereafter, the gas flows through a gap between the overlapping portion 45 and the negative electrode joining portion 52 to reach the pressure release valve 18. Thus, with the arrangement of the overlapping portion 45, the gas discharge path is further lengthened, and the fragments of the electrodes 21, 31 and the metal foils 21a, 31a in the gas fall into the case 11. Thus, the fragments in the gas are not discharged out of the case 11, and the generation of sparks is reduced.

In the mode shown in FIG. 10, when the shielding portion covering the pressure release valve 18 is the negative electrode shielding portion 54 of the negative electrode conductive member 51, the overlapping portion 45 may be arranged on the rib 54c of the negative electrode shielding portion 54 and the positive electrode joining portion 42 and the overlapping portion 45 may overlap in the height-wise direction.

Figure 15:
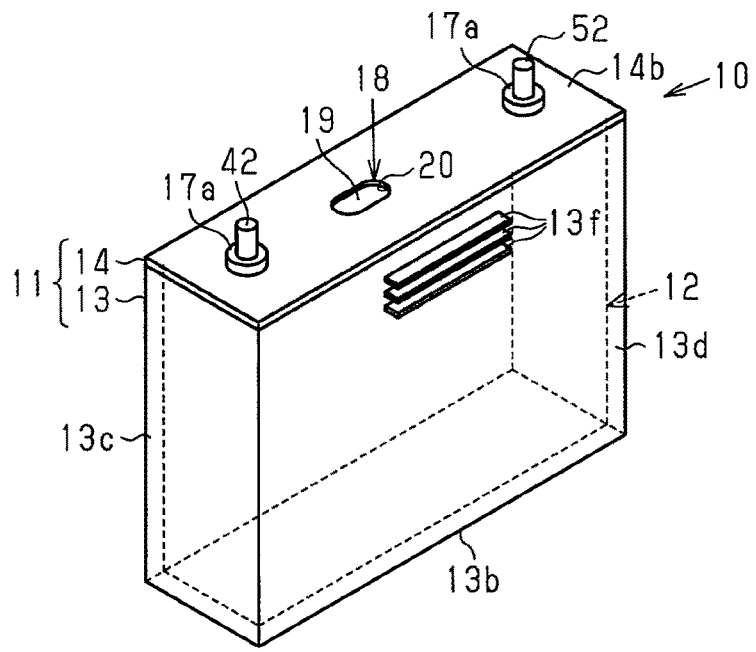
FIG. 15 is a perspective view showing a rechargeable battery including a case rib.

In each embodiment and each mode, as shown in FIG. 15, the rechargeable battery 10 may include a case rib 13f at the long side wall 13d of the case main body 13. The case rib 13f has a rectangular plate shape in which the long side is extended in the longitudinal direction of the long side wall 13d, and a plurality of the ribs 13f is provided in a short side direction of the long side wall 13d. Furthermore, when the lid body 14 is viewed from the outer surface 14b, the case rib 13f is arranged along the positive electrode shielding portion 44 and the negative electrode shielding portion 54.

When configured in such manner, during the nail penetration test, the electrode assembly 12 is expanded in the stacking direction as the temperature rises, and the case 11 deforms and widens in the stacking direction as the electrode assembly 12 expands. However, deformation of the case 11 in the stacking direction can be reduced by the case rib 13f. As a result, the gap between the outer surface of the first rib 44a and the negative electrode rib 54a and the inner surface of the long side wall 13d is less likely to widen, and the passage of gas is limited.

Figure 16:
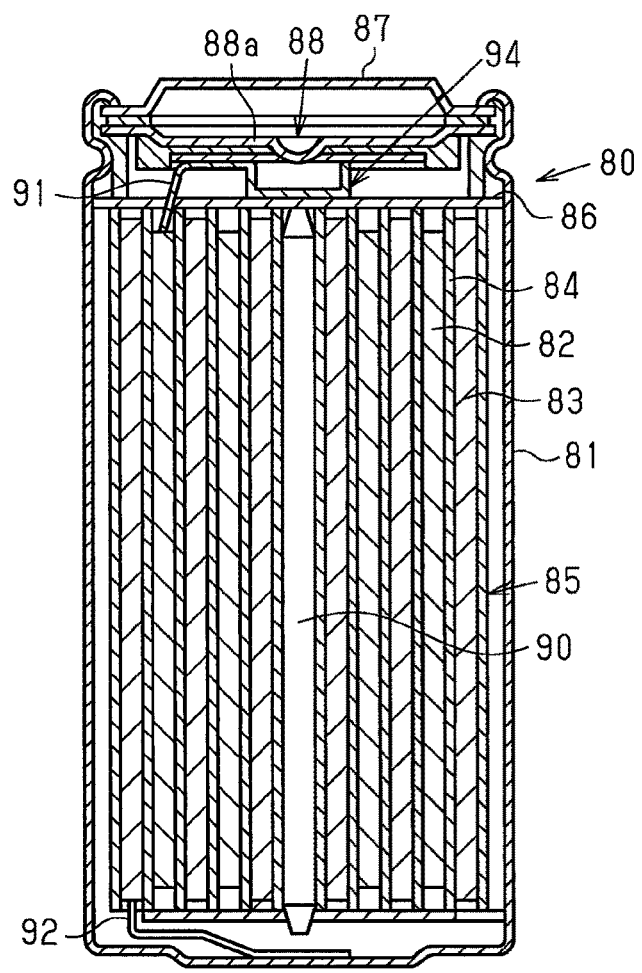
FIG. 16 is a cross-sectional view showing a rechargeable battery of a cylindrical type.

As shown in FIG. 16, a rechargeable battery 80 may be of a cylindrical type. The rechargeable battery 80 includes an electrode assembly 85 in which a band shaped positive electrode 82 and a band shaped negative electrode 83 are stacked and wound by a separator 84 in the interior of a hollow circular column shaped case 81. The case 81 is made of metal, and has a shape in which one end in an axial direction is closed and the other end is open. The separator 84 is impregnated with the electrolytic solution in the case 81. Furthermore, the rechargeable battery 80 includes an insulating plate 86 at both ends in the axial direction of the electrode assembly 85. In the cylindrical type rechargeable battery 80, the radial direction of the case 81 is a stacking direction (direction of X axis) of the electrodes 82, 83.

The rechargeable battery 80 includes a lid body 87 serving as a wall at the open end of the case 81, and a pressure release valve 88 arranged on the inner side of the lid body 87. The pressure release valve 88 is electrically connected to the lid body 87, and during the nail penetration test or when the pressure in the case 81 reaches the release pressure due to an internal short circuit or the like, a disc plate 88a of the pressure release valve 88 is ripped open so that the pressure in the case 81 is released out of the case 81.

Furthermore, the rechargeable battery 80 includes a center pin 90 arranged at the center of the electrode assembly 85. A positive electrode lead 91 is connected to the positive electrode 82 of the electrode assembly 85, and a negative electrode lead 92 is connected to the negative electrode 83. The positive electrode lead 91 has one end fixed to the positive electrode 82, and the other end welded to the pressure release valve 88 to be electrically connected to the lid body 87. The negative electrode lead 92 has one end connected to the negative electrode 83 and the other end welded to the case 81 and electrically connected. The rechargeable battery 80 includes a shielding portion 94 that covers the pressure release valve 88 from a side of the lid body 14 where the electrode assembly 85 is located in the positive electrode lead 91.

Figure 17:
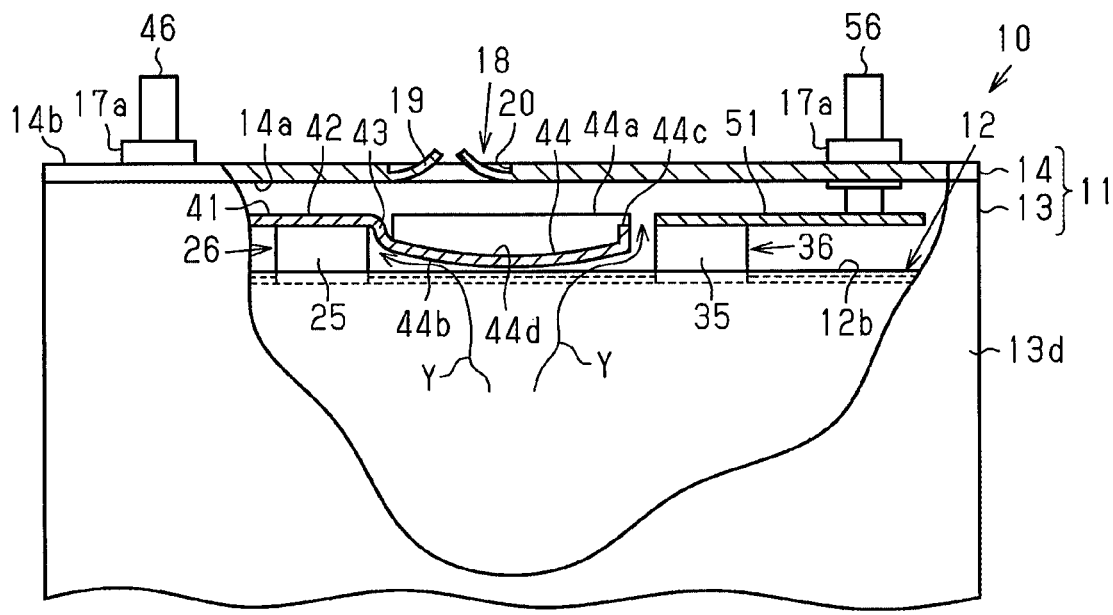
FIG. 17 is a partial cross-sectional view showing a positive electrode conductive member including a round shielding portion.

As shown in FIG. 17, the positive electrode shielding portion 44 may have a round shape that gradually bulges out toward the tab side end face 12b entirely across from the peripheral edge portion toward the central portion. Furthermore, the round shape is not limited to the shape shown in FIG. 17. Only the edge of the positive electrode shielding portion 44 may be round and the vicinity of the central portion may have a flat plane shape that extends along the tab side end face 12b. Furthermore, this is not limited to the positive electrode shielding portion 44, and the negative electrode shielding portion 54 may have a round shape.

When configured in such manner, during the nail penetration test, the gas directed toward the pressure release valve 18 strikes the outer surfaces 44b, 54b of the shielding portions 44, 54 as shown by arrow Y. However, the shielding portions 44, 54 are not deformed by the gas because the shielding portions 44, 54 have a round shape.

Figure 18:
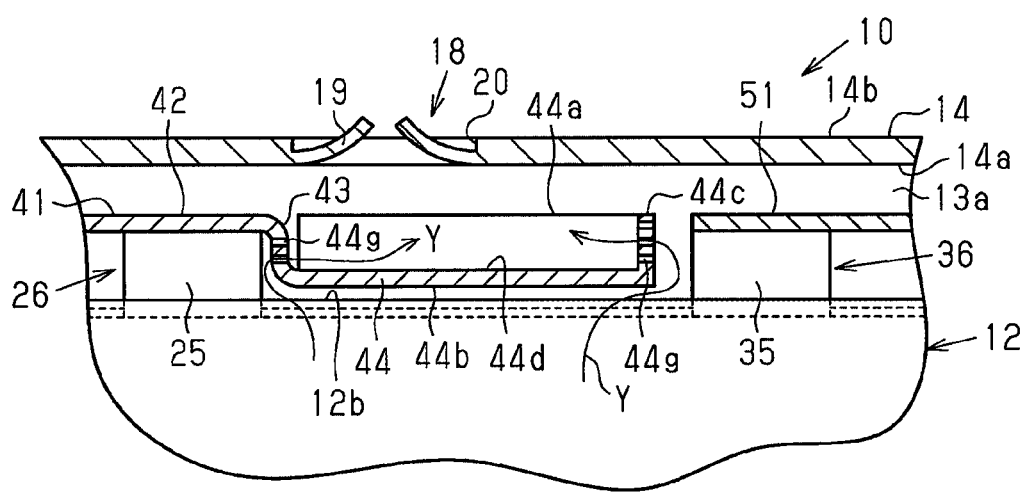
FIG. 18 is a partial cross-sectional view showing a shielding portion in which a gas passage hole is formed in a second rib.

As shown in FIG. 18, in the first embodiment, the positive electrode shielding portion 44 may be shaped to include a plurality of gas passage holes 44g that extend through the second rib 44c in the plate thickness direction. When configured in such manner, parts of the electrodes 21, 31 and the metal foils 21a, 31a in the gas strike the second rib 44c and fall out of the gas. The gas can flow through the gas passage hole 44g and be released out of the case 11 from the pressure release valve 18. The gas passage hole 44g functions to remove fragments of the electrodes 21, 31 and the metal foils 21a, 31a that cause sparks. As a result, fragments are not scattered to the outside of the case 11 with the gas, and the generation of sparks is reduced. The hole diameter of the gas passage hole 44g is suitably changed in accordance with the size of the fragments in the gas.

As shown in FIG. 10, when the negative electrode shielding portion 54 is arranged in the negative electrode conductive member 51, the gas passage hole 44g may be provided in the rib 54c.

In the first embodiment, the positive electrode shielding portion 44 may be separate from the positive electrode joining portion 42 and the positive electrode coupling portion 43, which are interposing portions of the positive electrode conductive member 41. In the second embodiment, the negative electrode shielding portion 54 may be separate from the negative electrode joining portion 52 and the negative electrode coupling portion 53, which are interposing portions of the negative electrode conductive member 51.

The positive electrode joining portion 42, the positive electrode coupling portion 43, and the positive electrode shielding portion 44 may be separate from each other and integrally connected to configure the positive electrode conductive member 41. The negative electrode joining portion 52, the negative electrode coupling portion 53, and the negative electrode shielding portion 54 may be separate from one another and integrally connected to configure the negative electrode conductive member 51.

In the first embodiment, the second rib 44c of the positive electrode shielding portion 44 may be eliminated. Furthermore, in the second embodiment, the rib may be arranged along the short side of the negative electrode shielding portion 54.

In the first embodiment, the first rib 44a of the positive electrode shielding portion 44 may be eliminated, and the first rib 44a may be projected from only one of the two long sides of the positive electrode shielding portion 44.

In the second embodiment, the negative electrode rib 54a of the negative electrode shielding portion 54 may be eliminated, and the negative electrode rib 54a may be projected from only one of the two long sides of the negative electrode shielding portion 54.

In the first embodiment, a distal end in the projecting direction of the positive electrode shielding portion 44 from the positive electrode coupling portion 43 does not have to project beyond the pressure release valve 18 in the longitudinal direction of the lid body 14 and may be located at the same position as the pressure release valve 18.

In the second embodiment, the positional relationship in the height-wise direction of the positive electrode shielding portion 44 and the negative electrode shielding portion 54 may be reversed so that the negative electrode shielding portion 54 becomes closer to the electrode assembly 12 than the positive electrode shielding portion 44.

The wall of the case 11 may be the short side wall 13c or the long side wall 13d of the case main body 13 instead of the lid body 14.

The separator 24 does not have to be of a type interposed between each positive electrode 21 and the adjacent negative electrode 31, and for example, may be a bag-like separator accommodating the positive electrode 21.

Alternatively, the separator may be of an elongated type bent in a zigzagged manner between the positive electrode 21 and the negative electrode 31.

The positive electrode 21 may be of a type including the positive electrode active material layer 21b on one surface of the positive electrode metal foil 21a, and the negative electrode 31 may be of a type including the negative electrode active material layer 31b on one surface of the negative electrode metal foil 31a.

The electric storage device may be a different type of electric storage device such as an electrical double layer capacitor.

In the embodiment, the rechargeable battery 10 is a lithium ion rechargeable battery but instead may be a different type of rechargeable battery such as nickel-metal hydride battery. It is only required that the rechargeable battery moves ions and exchanges charges between the positive electrode active material layer and the negative electrode active material layer.

DESCRIPTION OF REFERENCE CHARACTERS 10) rechargeable battery serving as electric storage device; 11) case; 12, 60) electrode assembly; 12b) tab side end face serving as end face of electrode assembly; 13f) case rib; 14) lid serving as wall; 14a) inner surface; 18) pressure release valve; 21) positive electrode serving as electrode; 21a) positive electrode metal foil serving as metal foil; 21b) positive electrode active material layer; 25) tab serving as non-coated portion; 31) negative electrode serving as electrode; 31a) negative electrode metal foil serving as metal foil; 31b) negative electrode active material layer; 35) tab serving as non-coated portion; 41) positive electrode conductive member serving as conductive member; 42) positive electrode joining portion serving as interposing portion; 43) positive electrode coupling portion serving as interposing portion; 44) positive electrode shielding portion serving as shielding portion; 44a) first rib; 44c) second rib; 44g) gas passage hole; 45) overlapping portion; 51) negative electrode conductive member serving as conductive member; 51d) bent portion; 52) negative electrode joining portion serving as interposing portion; 53) negative electrode coupling portion serving as interposing portion; 54) negative electrode shielding portion serving as shielding portion; 54a) negative electrode rib; 60a) end face; 61) positive electrode serving as electrode; 62) metal foil; 64) positive electrode non-coated portion serving as non-coated portion; 65) positive electrode conductive member serving as conductive member; 65c) interposing portion; 65d) shielding portion; 71) negative electrode serving as electrode; 72) metal foil; 73) negative electrode active material layer; 74) negative electrode non-coated portion serving as non-coated portion; 75) negative electrode conductive member serving as conductive member; 75c) interposing portion

The invention claimed is:

1. An electric storage device comprising:
an electrode assembly having a layered structure and including a positive electrode and a negative electrode insulated from each other, wherein each of the positive electrode and the negative electrode includes a metal foil, an active material layer applied to at least one surface of the metal foil, and a non-coated portion where the active material layer is not applied and the metal foil is exposed;
a case that accommodates the electrode assembly;

a pressure release valve existing on a wall of the case and configured to be ripped open when pressure in the case reaches a release pressure in order to release the pressure out of the case;

a positive electrode conductive member and a negative electrode conductive member that at least partially exist between an inner surface of the wall where the pressure release valve exists and an end face of the electrode assembly facing the inner surface, wherein the positive electrode conductive member and the negative electrode conductive member are electrically connected to the non-coated portion of the positive electrode and the non-coated portion of the negative electrode, respectively;

a positive electrode terminal joined with the positive electrode conductive member and extending through the wall; and a negative electrode terminal joined with the negative electrode conductive member and extending through the wall, wherein the pressure release valve is arranged between the positive electrode terminal and the negative electrode terminal, and wherein at least one of the positive electrode conductive member and the negative electrode conductive member includes an interposing portion located between the inner surface of the wall and the end face of the electrode assembly, and a shielding portion located closer to the end face of the electrode assembly than the interposing portion, wherein the shielding portion covers the pressure release valve from a side of the wall where the electrode assembly is located.

2. The electric storage device according to claim 1, wherein
the case is made of aluminum, and
the positive electrode conductive member includes the shielding portion and is made of aluminum.

3. The electric storage device according to claim 1, wherein the negative electrode conductive member includes the shielding portion and is made of copper.

4. The electric storage device according to claim 1, wherein
the positive electrode includes a positive electrode tab connected to the positive electrode conductive member,
the negative electrode includes a negative electrode tab connected to the negative electrode conductive member,
the positive electrode tab and the negative electrode tab are each shaped to project from the end face of the electrode assembly,
one of the positive electrode conductive member and the negative electrode conductive member is a first conductive member including the shielding portion,
the other one of the positive electrode conductive member and the negative electrode conductive member is a second conductive member not including the shielding portion, and
the first conductive member includes an overlapping portion overlapping a tab having a polarity differing from a polarity of the first conductive member and covering the tab as viewed from an outer surface of the wall.

5. The electric storage device according to claim 4, wherein the overlapping portion and the second conductive member are spaced apart in a direction connecting the wall and the electrode assembly.

6. The electric storage device according to claim 1, wherein
one of the positive electrode conductive member and the negative electrode conductive member is a first conductive member including the shielding portion,
the other one of the positive electrode conductive member and the negative electrode conductive member is a second conductive member not including the shielding portion;
the second conductive member is located closer to the wall than the first conductive member,
the first conductive member and the second conductive member overlap each other in a direction connecting the wall and the electrode assembly, and
the second conductive member includes a bent portion that is bent so that a distal end of the second conductive member is directed toward an edge of the pressure release valve.

7. The electric storage device according to claim 1, wherein the positive electrode conductive member and the negative electrode conductive member are arranged so as not to overlap each other in a direction connecting the wall and the electrode assembly.

8. The electric storage device according to claim 1, wherein
the positive electrode conductive member and the negative electrode conductive member each include the shielding portion, and
the shielding portions both overlap each other in a direction connecting the wall and the electrode assembly.

9. The electric storage device according to claim 1, wherein
an axis extending in a stacking direction of the positive electrode and the negative electrode is referred to as an X axis,
an axis orthogonal to the X axis and parallel to the wall is referred to as a Y axis,
the positive electrode conductive member and the negative electrode conductive member are arranged next to each other in a direction of the Y axis,
the pressure release valve is arranged closer to one end in the direction of the Y axis, and
one of the conductive members that is arranged closer to the one end includes the shielding portion.

10. The electric storage device according to claim 1, wherein
an axis extending in a stacking direction of the positive electrode and the negative electrode is referred to as an X axis,
an axis orthogonal to the X axis and parallel to the wall is referred to as a Y axis,
the positive electrode conductive member and the negative electrode conductive member are arranged next to each other in a direction of the Y axis,
the positive electrode is one of a plurality of stacked positive electrode and the negative electrode is one of a plurality of stacked negative electrodes, and
the at least one of the conductive members including the shielding portion includes a rib projecting toward the wall from an edge of the shielding portion extending in the direction of the Y axis.

11. The electric storage device according to claim 1, wherein an axis extending in a stacking direction of the positive electrode and the negative electrode is referred to as an X axis, an axis orthogonal to the X axis and parallel to the wall is referred to as a Y axis, the positive electrode conductive member and the negative electrode conductive member are arranged next to each other in a direction of the Y axis, and the at least one of the conductive members including the shielding portion further includes a rib projecting toward the wall from an edge of the shielding portion extending in a direction of the X axis.

12. The electric storage device according to claim 11, wherein the rib projecting from the edge of the shielding portion, which extends in the direction of the X axis, includes a gas passage hole.

13. An electric storage device comprising:

an electrode assembly having a layered structure and including a positive electrode and a negative electrode insulated from each other, wherein each of the positive electrode and the negative electrode includes a metal foil, an active material layer applied to at least one surface of the metal foil, and a non-coated portion where the active material layer is not applied and the metal foil is exposed;

a case that accommodates the electrode assembly;

a pressure release valve existing on a wall of the case and configured to be ripped open when pressure in the case reaches a release pressure in order to release the pressure out of the case; and a positive electrode conductive member and a negative electrode conductive member that at least partially exist between an inner surface of the wall where the pressure release valve exists and an end face of the electrode assembly facing the inner surface, wherein the positive electrode conductive member and the negative electrode conductive member are electrically connected to the non-coated portion of the positive electrode and the non-coated portion of the negative electrode, respectively, wherein the positive electrode includes a positive electrode tab connected to the positive electrode conductive member, the negative electrode includes a negative electrode tab connected to the negative electrode conductive member, the positive electrode tab and the negative electrode tab are each shaped to project from the end face of the electrode assembly toward the wall facing the end face, and at least one of the positive electrode conductive member and the negative electrode conductive member includes an interposing portion located between the inner surface of the wall and the end face of the electrode assembly, and a flat shielding portion continuous and flush with the interposing portion along the inner surface of the wall, wherein the shielding portion covers the pressure release valve from a side of the wall where the electrode assembly is located.

14. An electric storage device comprising:

an electrode assembly having a layered structure and including a positive electrode and a negative electrode insulated from each other, wherein each of the positive electrode and the negative electrode includes a metal foil, an active material layer applied to at least one surface of the metal foil, and a non-coated portion where the active material layer is not applied and the metal foil is exposed;

a case that accommodates the electrode assembly;

a pressure release valve existing on a wall of the case and configured to be ripped open when pressure in the case reaches a release pressure in order to release the pressure out of the case; and a positive electrode conductive member and a negative electrode conductive member that at least partially exist between an inner surface of the wall where the pressure release valve exists and an end face of the electrode assembly facing the inner surface, wherein the positive electrode conductive member and the negative electrode conductive member are electrically connected to the non-coated portion of the positive electrode and the non-coated portion of the negative electrode, respectively, wherein at least one of the positive electrode conductive member and the negative electrode conductive member includes an interposing portion located between the inner surface of the wall and the end face of the electrode assembly, a shielding portion located closer to the end face of the electrode assembly than the interposing portion, and a rib rising from the shielding portion toward the wall and including a surface intersecting a gas path lying along a plane direction of the shielding portion, wherein the shielding portion covers the pressure release valve from a side of the wall where the electrode assembly is located.

* * * * *